(12) United States Patent
Yamazaki et al.

(10) Patent No.: US 10,546,545 B2
(45) Date of Patent: Jan. 28, 2020

(54) ELECTRONIC DEVICE

(71) Applicant: Semiconductor Energy Laboratory Co., Ltd., Kanagawa-ken (JP)

(72) Inventors: Shunpei Yamazaki, Tokyo (JP); Atsushi Miyaguchi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 117 days.

(21) Appl. No.: 15/499,384

(22) Filed: Apr. 27, 2017

(65) Prior Publication Data

US 2017/0316750 A1  Nov. 2, 2017

(30) Foreign Application Priority Data

Apr. 28, 2016 (JP) .................................. 2016-089999
Jul. 8, 2016 (JP) .................................. 2016-135721

(51) Int. Cl.
*G09G 3/36* (2006.01)
*G02F 1/133* (2006.01)
(Continued)

(52) U.S. Cl.
CPC ....... *G09G 3/3611* (2013.01); *G02F 1/13318* (2013.01); *G02F 1/13338* (2013.01);
(Continued)

(58) Field of Classification Search
CPC .. G09G 3/3611; G09G 3/32; G09G 2360/144; G09G 2330/021; H02J 7/007;
(Continued)

(56) References Cited

U.S. PATENT DOCUMENTS 6,714,268 B2  3/2004  Wang et al.
7,038,641 B2  5/2006  Hirota et al.
(Continued)

FOREIGN PATENT DOCUMENTS

JP  11-260669     9/1999
JP  2001-066593 A  3/2001
(Continued)

OTHER PUBLICATIONS

Shieh, H-P., "Transflective Display by Hybrid OLED and LCD," LEOS 2005 (IEEE Lasers and Electro-Optics Society Annual Meeting), Oct. 22, 2005, pp. 650-651, IEEE.
(Continued)

*Primary Examiner* — Amit Chatly
(74) *Attorney, Agent, or Firm* — Husch Blackwell LLP

(57) ABSTRACT

The electronic device includes a first housing including a solar battery, a first display device, and a first structure body and a second housing including a second display device, a coil, an electric double-layer capacitor, a signal processing circuit, a charge and discharge control circuit, and a second structure body. The electronic device can be folded so that display surfaces of the first housing and the second housing face each other and the first structure body and the second structure body face each other. The solar battery is provided on a surface of the first housing on the rear side of the first display device. A pixel included in the first display device and a pixel included in the second display device each include a liquid crystal element, a first pixel circuit, a light-emitting element, and a second pixel circuit. The liquid crystal element includes a reflective electrode having an opening and can perform display by reflecting external light. The light-emitting element can perform display by emitting light toward the display surface through the opening.

19 Claims, 22 Drawing Sheets

(51) Int. Cl.
*G02F 1/1333* (2006.01)
*G02F 1/1335* (2006.01)
*G06F 1/16* (2006.01)
*H02J 7/00* (2006.01)
*H02J 7/35* (2006.01)
*H01G 11/00* (2013.01)
*H02J 7/34* (2006.01)

(52) U.S. Cl.
CPC ...... *G02F 1/133553* (2013.01); *G06F 1/1616* (2013.01); *G06F 1/1643* (2013.01); *G06F 1/1647* (2013.01); *H02J 7/007* (2013.01); *H02J 7/0047* (2013.01); *H02J 7/0068* (2013.01); *H02J 7/35* (2013.01); *G02F 2001/13324* (2013.01); *G02F 2202/10* (2013.01); *G09G 2330/021* (2013.01); *G09G 2360/144* (2013.01); *H01G 11/00* (2013.01); *H02J 7/345* (2013.01)

(58) Field of Classification Search
CPC .......... H02J 7/0047; H02J 7/0068; H02J 7/35; H02J 7/345; G06F 1/1647; G06F 1/1616; G06F 1/1643; G02F 1/13338; G02F 1/133553; G02F 1/133318; G02F 1/133555; G02F 2001/13324; G02F 2202/10; G02F 2001/133626; G02F 2201/44; H01G 11/14; H01G 11/00
See application file for complete search history.

(56) References Cited

U.S. PATENT DOCUMENTS

| | | |
|---|---|---|
| 7,084,936 B2 | 8/2006 | Kato |
| 7,102,704 B2 | 9/2006 | Mitsui et al. |
| 7,176,991 B2 | 2/2007 | Mitsui et al. |
| 7,239,361 B2 | 7/2007 | Kato |
| 7,248,235 B2 | 7/2007 | Fujii et al. |
| 7,385,654 B2 | 6/2008 | Mitsui et al. |
| 7,864,151 B1 | 1/2011 | Yamazaki et al. |
| 8,477,158 B2 | 7/2013 | Umezaki et al. |
| 8,605,059 B2 | 12/2013 | Kurokawa et al. |
| 8,816,662 B2 | 8/2014 | Takahashi et al. |
| 8,830,661 B2 | 9/2014 | Yamazaki et al. |
| 9,129,568 B2 | 9/2015 | Kubota et al. |
| 9,190,525 B2 | 11/2015 | Yamazaki |
| 9,269,725 B2 | 2/2016 | Yamazaki |
| 9,337,214 B2 | 5/2016 | Kubota et al. |
| 9,390,664 B2 | 7/2016 | Yamazaki et al. |
| 9,406,268 B2 | 8/2016 | Imada |
| 9,449,569 B2 | 9/2016 | Yamazaki et al. |
| 9,478,704 B2 | 10/2016 | Nishijima et al. |
| 9,500,916 B2 | 11/2016 | Fukai et al. |
| 9,508,276 B2 | 11/2016 | Hirakata et al. |
| 9,569,992 B2 | 2/2017 | Yamazaki et al. |
| 9,625,776 B2 | 4/2017 | Kubota |
| 9,626,889 B2 | 4/2017 | Iwaki |
| 9,640,104 B2 | 5/2017 | Yamazaki et al. |
| 10,027,896 B2 | 7/2018 | Ikeda |
| 2003/0201960 A1 | 10/2003 | Fujieda |
| 2005/0060670 A1* | 3/2005 | Inui ...................... G06F 1/3215 715/867 |
| 2005/0252546 A1* | 11/2005 | Sasaki .................... H02J 7/35 136/243 |
| 2006/0072047 A1 | 4/2006 | Sekiguchi |
| 2007/0194759 A1* | 8/2007 | Shimizu ................ H02J 7/0016 320/166 |
| 2008/0158217 A1 | 7/2008 | Hata et al. |
| 2008/0180618 A1 | 7/2008 | Fujieda |
| 2010/0171905 A1 | 7/2010 | Huang et al. |
| 2010/0209784 A1 | 8/2010 | Yamazaki et al. |
| 2010/0307558 A1 | 12/2010 | Yamazaki et al. |
| 2010/0307559 A1 | 12/2010 | Yamazaki et al. |
| 2011/0013351 A1* | 1/2011 | Simmons ................ G06F 1/162 361/679.27 |
| 2011/0073561 A1 | 3/2011 | Yamazaki et al. |
| 2011/0073991 A1 | 3/2011 | Kuriki et al. |
| 2011/0075322 A1 | 3/2011 | Kuriki et al. |
| 2011/0075325 A1 | 3/2011 | Ito et al. |
| 2011/0090204 A1 | 4/2011 | Yamazaki et al. |
| 2011/0148846 A1* | 6/2011 | Arasawa ............... G09G 3/3614 345/212 |
| 2011/0157253 A1* | 6/2011 | Yamazaki ......... G02F 1/133555 345/690 |
| 2011/0212363 A1 | 9/2011 | Yamazaki et al. |
| 2011/0216043 A1 | 9/2011 | Tamura et al. |
| 2011/0236567 A1 | 9/2011 | Kuriki |
| 2011/0285426 A1 | 11/2011 | Takahashi et al. |
| 2011/0285945 A1* | 11/2011 | Aihara ............... G02F 1/133553 349/113 |
| 2012/0120047 A1 | 5/2012 | Choi et al. |
| 2014/0015819 A1 | 1/2014 | Yamazaki et al. |
| 2014/0043315 A1 | 2/2014 | Yamazaki et al. |
| 2014/0146033 A1 | 5/2014 | Koyama et al. |
| 2014/0347588 A1 | 11/2014 | Hatsumi et al. |
| 2014/0368486 A1 | 12/2014 | Hata et al. |
| 2014/0368488 A1 | 12/2014 | Hatsumi et al. |
| 2014/0368982 A1 | 12/2014 | Yamazaki et al. |
| 2015/0045091 A1* | 2/2015 | Nakatani ............... H04B 5/0031 455/556.1 |
| 2015/0144920 A1 | 5/2015 | Yamazaki et al. |
| 2015/0255029 A1 | 9/2015 | Niikura et al. |
| 2015/0348961 A1 | 12/2015 | Isobe |
| 2016/0021314 A1 | 1/2016 | Kurokawa et al. |
| 2016/0275911 A1 | 9/2016 | Kubota et al. |
| 2016/0329024 A1 | 11/2016 | Maeda |
| 2016/0356645 A1 | 12/2016 | Yoneda et al. |
| 2017/0066559 A1* | 3/2017 | Kim ..................... B65D 33/1658 |
| 2017/0186364 A1 | 6/2017 | Okamoto et al. |
| 2017/0186365 A1 | 6/2017 | Yoneda |
| 2017/0214876 A1 | 7/2017 | Katagiri |
| 2017/0270882 A1 | 9/2017 | Mori et al. |
| 2018/0124522 A1* | 5/2018 | Park ..................... H04R 1/025 |

FOREIGN PATENT DOCUMENTS

| | | |
|---|---|---|
| JP | 2002-116904 A | 4/2002 |
| JP | 2002-170967 | 6/2002 |
| JP | 2002-196702 A | 7/2002 |
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-221531 | 8/2004 |
| JP | 2004-296162 A | 10/2004 |
| JP | 2007-147871 | 6/2007 |
| JP | 2007-232882 A | 9/2007 |
| JP | 2008-181108 | 8/2008 |
| JP | 4161574 B2 | 10/2008 |
| JP | 2010-034300 | 2/2010 |
| JP | 2010-135361 | 6/2010 |
| JP | 2011-170340 A | 9/2011 |
| JP | 2013-221965 A | 10/2013 |
| WO | WO 2004-053819 A1 | 6/2004 |

OTHER PUBLICATIONS

Lee, J-H. et al., "High Ambient-Contrast-Ratio Display Using Tandem Reflective Liquid Crystal Display and Organic Light-Emitting Device," Optics Express, Nov. 14, 2005, vol. 13, No. 23, pp. 9431-9438.

* cited by examiner

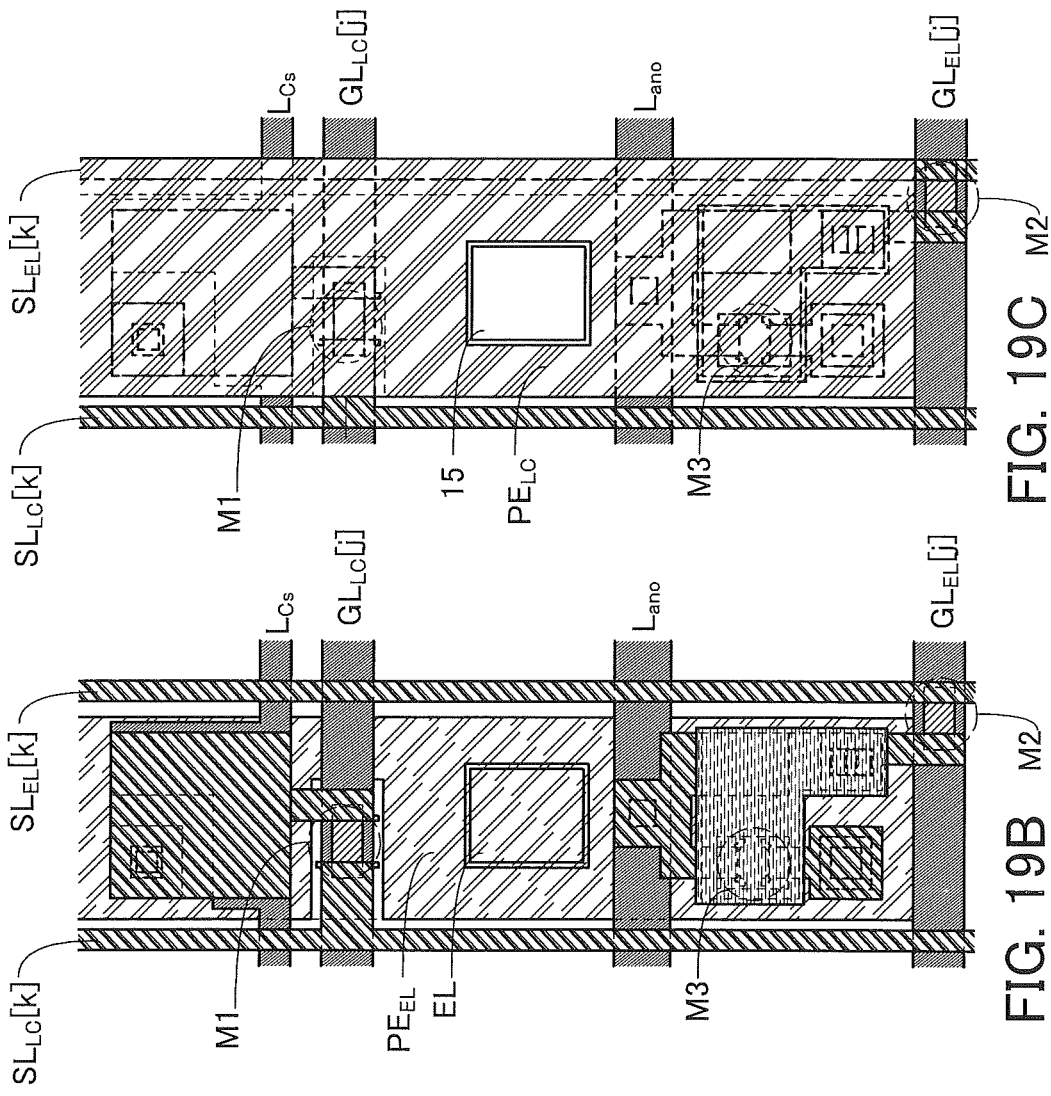
FIG. 19C
FIG. 19B
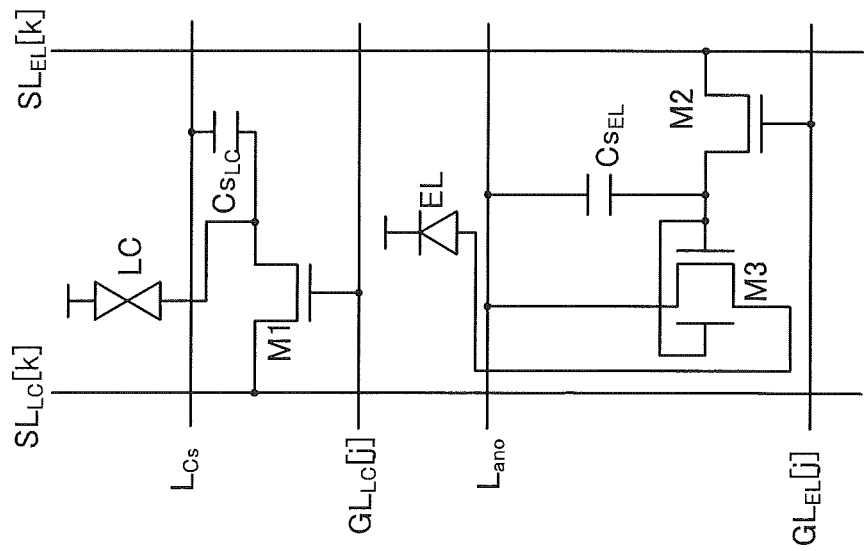
FIG. 19A

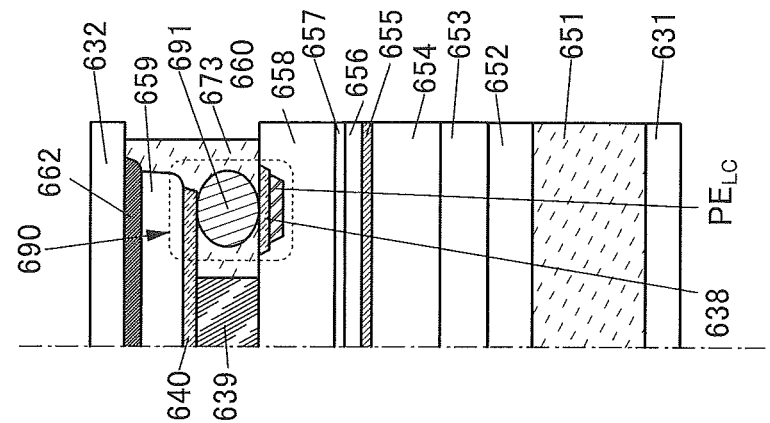
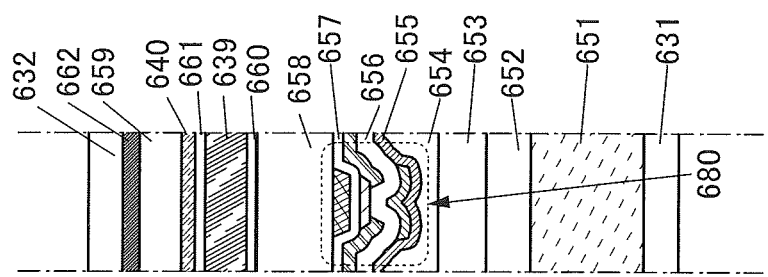
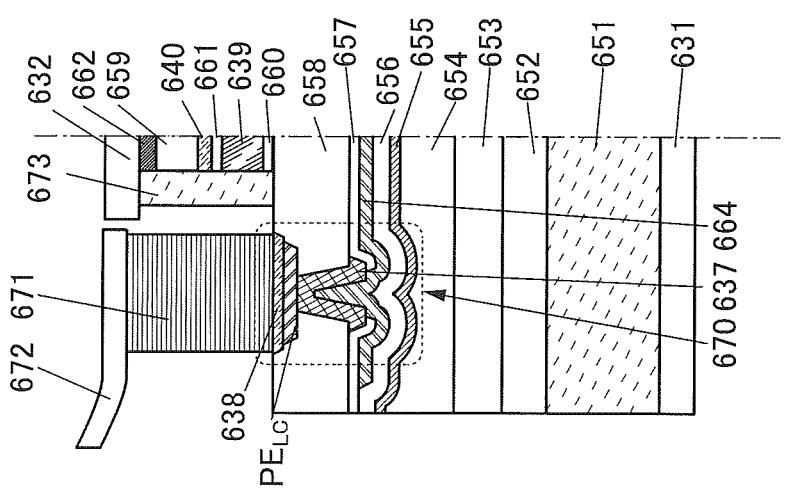

ELECTRONIC DEVICE

BACKGROUND OF THE INVENTION

1. Field of the Invention

One embodiment of the present invention relates to an electronic device.

2. Description of the Related Art

Electronic devices provided with display devices are widely used. When such an electronic device is carried around, a secondary battery is used as a power source. Extension of a power supply period by the secondary battery is effective for using the electronic device in outdoor environments for a long time.

Patent Document 1 discloses an electronic device provided with a solar battery which can charge a secondary battery even in outdoor environments to extend a power supply period by the secondary battery.

REFERENCE

Patent Document

[Patent Document 1] United States Patent Application Publication No. 2012/120047

SUMMARY OF THE INVENTION

An electronic device provided with a display device including a solar battery is assumed to be used in outdoor environments or indoor environments. When the electronic device is used in outdoor environments and a reflective liquid crystal display device is employed as the display device, the visibility in outdoor environments can be improved; however, the visibility in indoor environments might be decreased. When the electronic device is used in indoor environments utilizing a secondary battery as a power source and a transmissive liquid crystal display device or a display device including a self-luminous element (a light-emitting device) is employed as the display device, the visibility in indoor environments can be improved; however, the visibility in outdoor environments might be decreased. When a semi-transmissive liquid crystal display device is used as the display device, the visibility in indoor environments and outdoor environments are improved to some extent; however, the power consumption might be increased because a backlight emits light uniformly at the back surface of a liquid crystal element.

To increase the convenience of the electronic device for the use in outdoor environments or indoor environments, it is effective to improve carrying easiness (portability). To improve portability, reduction in the weight of the electronic device, particularly the secondary battery, is effective. However, it is difficult to achieve both an increase in visibility in outdoor and indoor environments and a reduction in power consumption in a liquid crystal display device or a light-emitting device, and to reduce the weight of the secondary battery.

An object of one embodiment of the present invention is to provide an electronic device which includes a solar battery and a display device with high visibility in outdoor and indoor environments.

Another object of one embodiment of the present invention is to provide an electronic device which includes a solar battery and a display device with high convenience, in particular high portability.

The description of these objects does not disturb the existence of other objects. One embodiment of the present invention does not necessarily achieve all the objects. Other objects will be apparent from and can be derived from the description of the specification, the drawings, the claims, and the like.

One embodiment of the present invention is an electronic device including a first housing including a solar battery and a first display device and a second housing including a second display device, a coil, an electric double-layer capacitor, a signal processing circuit, and a charge and discharge control circuit. The electronic device can be folded so that a display surface of the first display device and a display surface of the second display device face each other. The solar battery is positioned on a surface of the first housing on a rear side of the display surface of the first display device. The first display device and the second display device each include a pixel. The pixel includes a liquid crystal element, a first pixel circuit for driving the liquid crystal element, a light-emitting element, and a second pixel circuit for driving the light-emitting element. The liquid crystal element includes a reflective electrode comprising an opening and has a function of performing grayscale display by reflecting external light. The light-emitting element has a function of performing grayscale display by emitting light toward the display surface through the opening.

One embodiment of the present invention is an electronic device including a first housing including a solar battery, a first display device, and a first structure body and a second housing including a second display device, a coil, an electric double-layer capacitor, a signal processing circuit, a charge and discharge control circuit, and a second structure body. The electronic device can be folded so that a display surface of the first display device and a display surface of the second display device face each other. The electronic device can be folded so that the first structure body and the second structure body face each other. The solar battery is positioned on a surface of the first housing on a rear side of the display surface of the first display device. The first display device and the second display device each include a pixel. The pixel includes a liquid crystal element, a first pixel circuit for driving the liquid crystal element, a light-emitting element, and a second pixel circuit for driving the light-emitting element. The liquid crystal element includes a reflective electrode comprising an opening and has a function of performing grayscale display by reflecting external light. The light-emitting element has a function of performing grayscale display by emitting light toward the display surface through the opening.

In the electronic device of one embodiment of the present invention, each of the first pixel circuit and the second pixel circuit preferably includes a transistor, and the transistor preferably includes an oxide semiconductor in a semiconductor layer in which a channel formation region is formed.

In the electronic device of one embodiment of the present invention, the coil, the electric double-layer capacitor, the signal processing circuit, and the charge and discharge control circuit are preferably positioned in the second housing.

In the electronic device of one embodiment of the present invention, the charge and discharge control circuit preferably includes a monitor circuit, the monitor circuit preferably has a function of monitoring remaining capacity of the electric double-layer capacitor, and the signal processing circuit preferably has a function of changing a period during which a voltage for performing the grayscale display written in the first pixel circuit is held in accordance with the remaining capacity.

The electronic device of one embodiment of the present invention preferably includes a sensor. In the electronic device, it is preferable that the sensor have a function of measuring illuminance and the signal processing circuit have a function of switching between, in accordance with the illuminance, a first mode for performing grayscale display with the liquid crystal element, a second mode for performing grayscale display with the liquid crystal element and the light-emitting element, and a third mode for performing grayscale display with the light-emitting element.

In the electronic device of one embodiment of the present invention, each of the first display device and the second display device preferably includes a touch sensor.

Each of the first structure body and the second structure body is preferably formed using natural rubber or synthetic rubber. Each of the first structure body and the second structure body preferably has Young's modulus greater than or equal to 1 MPa and less than or equal to 1 GPa. Each of the first structure body and the second structure body may include a magnetic material.

Note that other embodiments of the present invention will be shown in the following embodiments and the drawings.

One embodiment of the present invention provides an electronic device which includes a solar battery and a display device with high visibility in outdoor and indoor environments.

One embodiment of the present invention provides an electronic device which includes a solar battery and a display device with high convenience, in particular high portability.

BRIEF DESCRIPTION OF THE DRAWINGS

In the accompanying drawings:

FIGS. 19A to 19C are a circuit diagram and layout diagrams illustrating a structure example of an electronic device;

FIGS. 22A to 22C are cross-sectional schematic views illustrating a structure example of an electronic device.

DETAILED DESCRIPTION OF THE INVENTION

Figure 1A:
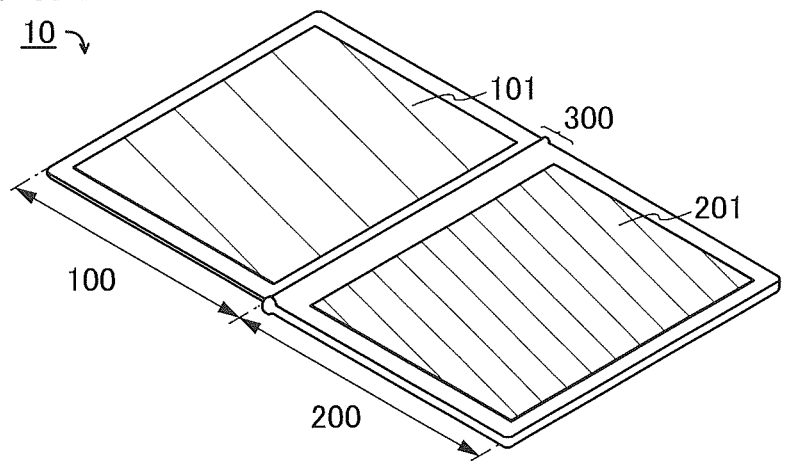
FIGS. 1A to 1C are perspective views illustrating a structure example of an electronic device.

Embodiments will be described below with reference to the drawings. Note that the embodiments can be implemented with various modes, and it will be readily appreciated by those skilled in the art that modes and details can be changed in various ways without departing from the spirit and scope of the present invention. Thus, the present invention should not be interpreted as being limited to the following description of the embodiments.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor layer of a transistor is called an oxide semiconductor in some cases. That is to say, a metal oxide that has at least one of an amplifying function, a rectifying function, and a switching function can be called a metal oxide semiconductor, or OS for short. In addition, an OS FET is a transistor including a metal oxide or an oxide semiconductor.

In this specification and the like, a metal oxide including nitrogen is also called a metal oxide in some cases. Moreover, a metal oxide including nitrogen may be called a metal oxynitride.

In this specification and the like, "c-axis aligned crystal (CAAC)" or "cloud-aligned composite (CAC)" might be stated. CAAC refers to an example of a crystal structure, and CAC refers to an example of a function or a material composition.

In this specification and the like, a CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a semiconductor layer of a transistor, the conducting function is to allow electrons (or holes) serving as carriers to flow and the insulating function is to not allow electrons serving as carriers to flow. By the complementary action of the conducting function and the insulating function, the CAC-OS or the CAC metal oxide can have a switching function (on/off function). In the CAC-OS or the CAC metal oxide, separation of the functions can maximize each function.

In this specification and the like, the CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS or the CAC metal oxide, the conductive regions and the insulating regions each have a size of more than or equal to 0.5 nm and less than or equal to 10 mm, preferably more than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used in a channel region of a transistor, high current drive capability in the on state of the transistor, that is, high on-state current and high field-effect mobility, can be obtained.

In other words, a CAC-OS or a CAC metal oxide can be called a matrix composite or a metal matrix composite.

<Structure of Electronic Device>

A structure of an electronic device will be described with reference to FIGS. 1A to 1C and FIGS. 2A and 2B.

Figure 1B:
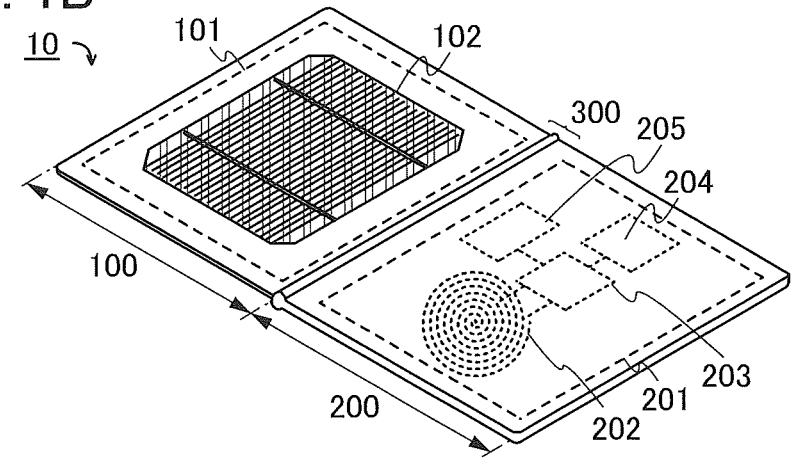
Figure 1C:
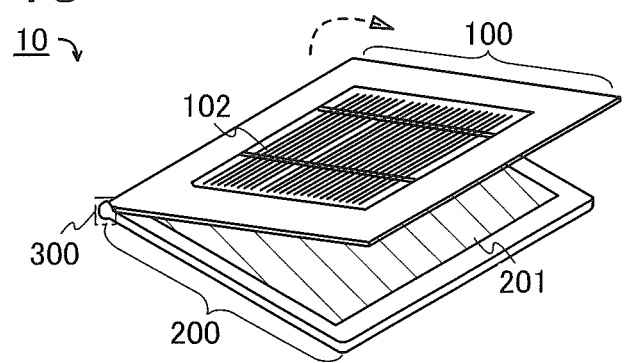

FIGS. 1A to 1C are perspective views illustrating a structure example of an electronic device. FIG. 1A is a view seen from one surface (a front surface) side of an electronic device 10. FIG. 1B is a view seen from the other surface (a rear surface) side of the electronic device 10. FIG. 1C shows an example of the electronic device 10 which is changed in form.

The electronic device 10 of FIGS. 1A to 1C includes a housing 100 and a housing 200. The housing 100 includes a display device 101 and a solar battery 102. The housing 200 includes a display device 201, a coil 202, a charge and discharge control circuit 203, an electric double-layer capacitor (EDLC) 204, and a signal processing circuit 205.

The electronic device 10 in FIGS. 1A to 1C includes a hinge portion 300 with which the electronic device 10 can be folded so that a display surface of the display device 101 and a display surface of the display device 201 face each other.

The hinge portion 300 includes, as illustrated in FIG. 1C, a hinge mechanism with which the housing 100 and the housing 200 can open and close. The hinge mechanism may have a structure with which a rotatable hinge mechanism, a detachable hinge mechanism, or the like is combined. With such a foldable structure, the display surfaces of the display device 101 and the display device 201 can be protected from external impact.

The electronic device 10 of FIGS. 1A to 1C includes the solar battery 102 on a surface of the housing 100 on the side opposite to the display surface of the display device 101.

The electronic device 10 of FIGS. 1A to 1C includes the coil 202, the charge and discharge control circuit 203, the electric double-layer capacitor 204, and the signal processing circuit 205 in the housing 200.

Figure 2A:
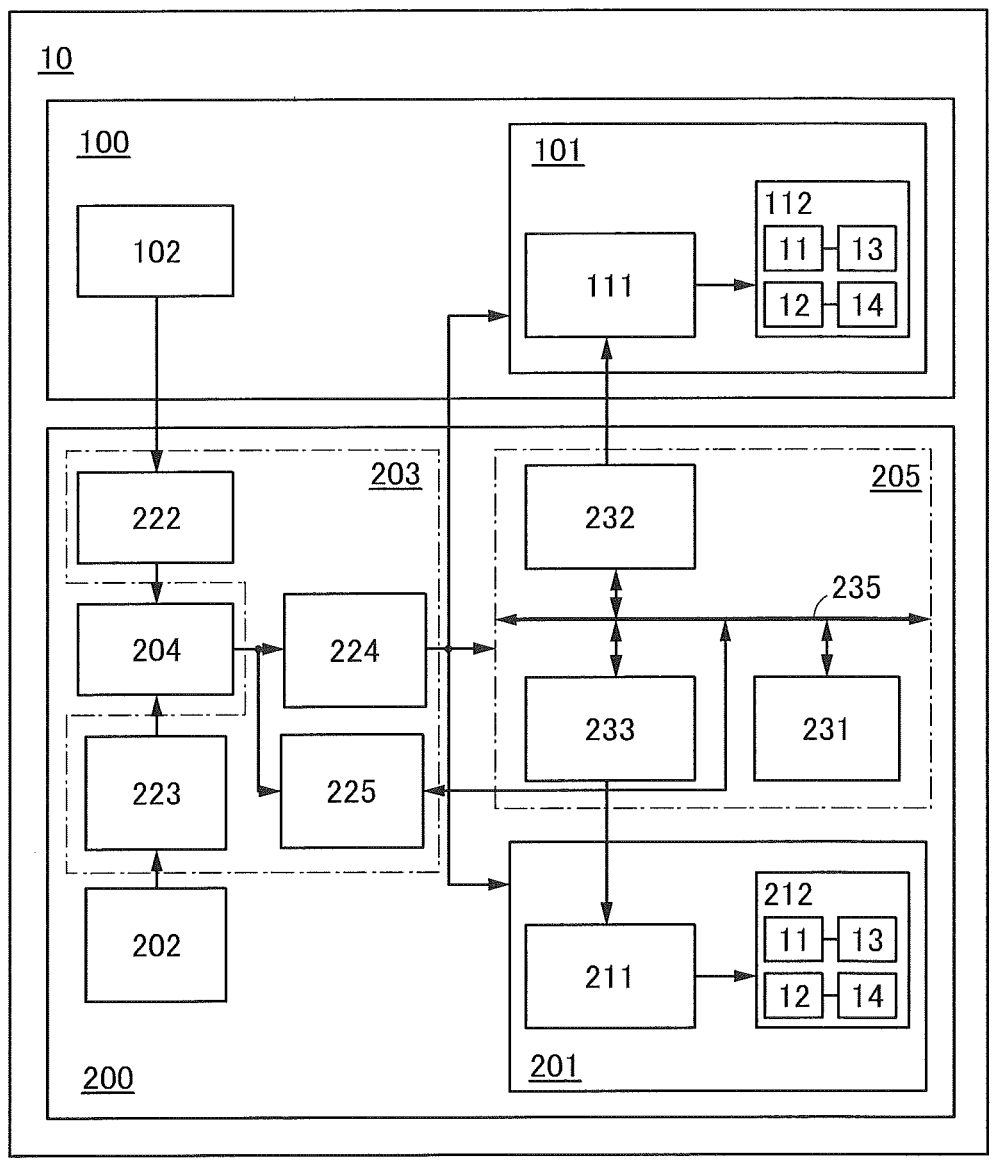
FIGS. 2A and 2B are a block diagram illustrating a structure example of an electronic device and a schematic view illustrating a structure example of a pixel included in the display device.
Figure 2B:
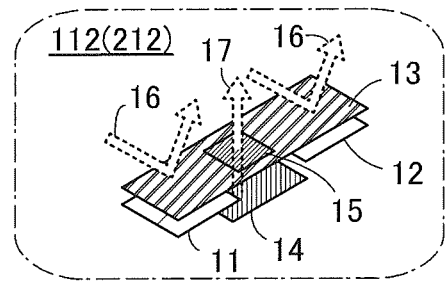

FIG. 2A is a block diagram illustrating the structure of the electronic device 10 of FIGS. 1A to 1C. FIG. 2B is a schematic view illustrating a structure of a pixel included in the display device 101 and the display device 201.

The electronic device 10 in FIG. 2A includes the housing 100 and the housing 200. The components shown by the blocks in the housing 100 and the housing 200 can transmit and receive a signal and power to and from each other through wirings or the like. FIG. 2A shows the flow of some signals and the flow of part of power using arrows.

The housing 100 includes the display device 101 and the solar battery 102.

The display device 101 includes a display controller 111 and a pixel 112. The pixel 112 includes a pixel circuit 11, a pixel circuit 12, a liquid crystal element 13, and a light-emitting element 14.

The housing 200 includes the display device 201, the coil 202, the charge and discharge control circuit 203, the electric double-layer capacitor 204, and the signal processing circuit 205.

The display device 201 includes a display controller 211 and a pixel 212. The pixel 212 includes, like the pixel 112, a pixel circuit 11, a pixel circuit 12, a liquid crystal element 13, and a light-emitting element 14.

The liquid crystal element 13 included in the pixel 112 and the pixel 212 includes a liquid crystal layer, an electrode for applying an electric field to the liquid crystal layer, and a reflective electrode.

As the light-emitting element 14 included in the pixel 112 and the pixel 212, an electroluminescence (EL) element such as an organic electroluminescence element or an inorganic electroluminescence element can be used. The light-emitting element 14 is referred to as an EL element in some cases.

The charge and discharge control circuit 203 includes a reverse current prevention circuit 222, a rectifying and smoothing circuit 223, a stabilization circuit 224, and a monitor circuit 225.

The signal processing circuit 205 includes an arithmetic device 231, an interface circuit 232, an interface circuit 233, and a system bus 235.

The above-described components are described below.

The solar battery 102 generates power when it is irradiated with light in outdoor environments or the like. The generated power is stored in the electric double-layer capacitor 204 through the reverse current prevention circuit 222. The reverse current prevention circuit 222 is a circuit for preventing the flow of the stored power to the outside. As the reverse current prevention circuit 222, a rectifying element such as a diode element can be used.

The coil 202 obtains power from the outside by contactless power feeding such as an electromagnetic induction method. The power obtained from the outside by contactless power feeding is stored in the electric double-layer capacitor 204 through the rectifying and smoothing circuit 223. The rectifying and smoothing circuit 223 is a circuit for rectifying and smoothing an AC voltage obtained from the coil 202. As the rectifying and smoothing circuit 223, a capacitor and a rectifying element such as a diode element can be used.

The electric double-layer capacitor 204 is charged by accumulating charge and is discharged by releasing charge. Thus, the amount of remaining charge (remaining capacity) can be accurately estimated from the discharging voltage. In the electronic device including the electric double-layer capacitor 204, the display mode can be switched in accordance with accurate remaining capacity as compared with an electronic device including a secondary battery. Switching of the display mode in accordance with remaining capacity which can be estimated accurately can lead to a reduction in power consumption. An electronic device with reduced power consumption can be used for a longer period, so that the convenience can be improved.

The secondary battery is charged by converting electric energy into chemical energy or is discharged by converting chemical energy into electric energy. In contrast, the electric double-layer capacitor 204 is charged or discharged by storing or releasing charge, which serves as electric energy. Thus, the electric double-layer capacitor 204 has smaller power loss due to the charge and discharge than the secondary battery.

In addition, the electric double-layer capacitor 204 has lower internal resistance than the secondary battery. Thus, in the electronic device 10 including the electric double-layer capacitor 204, the rapid charge and discharge due to large current can be performed.

Moreover, in the electric double-layer capacitor 204, deterioration or the like of components due to the charge and discharge is small. Thus, in the electronic device 10 including the electric double-layer capacitor 204, cycle characteristics are excellent, the lifetime is long, and the charge and discharge with a high level of safety can be performed under high temperatures and low temperatures.

The electronic device 10 of one embodiment of the present invention is provided with the solar battery 102 which can generate power in outdoor environments. Thus, the electronic device 10 can be charged even when it is used in outdoor environments and can be used without the convenience impaired. Furthermore, the electronic device 10 of one embodiment of the present invention is provided with the coil 202 which can be charged in indoor environments. Thus, the electronic device 10 can be used while being charged when it is used in indoor environments and can be used without the convenience impaired. In the electronic device 10 of one embodiment of the present invention having a structure which can be charged in indoor and outdoor environments, the electric double layer with small energy capacity can be used without a reduction in convenience. Thus, the electronic device can be reduced in weight as compared with an electronic device in which a secondary battery is used as a power source. The electronic device 10 of one embodiment of the present invention can be highly portable due to the reduction in weight.

In the electric double-layer capacitor 204, output voltage is changed with a reduction in remaining capacity. Thus, the charge and discharge control circuit 203 includes the stabilization circuit 224 so that the stabilized output voltage can be supplied to each circuit included in the housing 100 and the housing 200. The stabilization circuit 224 has a function of raising the output voltage of the electric double-layer capacitor 204 and outputting the voltage as the stabilized voltage. As the stabilization circuit 224, for example, a step-up switching regulator can be used.

The electric double-layer capacitor 204 includes, for example, a negative electrode, a positive electrode, a separator, and an electrolyte solution as components. As the electric double-layer capacitor 204, a coin-type electric double-layer capacitor, a button-type electric double-layer capacitor, a wound electric double-layer capacitor, or the like can be used. The electric double-layer capacitor 204 may be a module in which a plurality of cells are stacked.

The charge and discharge control circuit 203 includes the monitor circuit 225 which monitors the output voltage of the electric double-layer capacitor 204. The monitor circuit 225 is provided to estimate the remaining capacity of the electric double-layer capacitor 204. The monitor circuit 225 outputs a signal in accordance with the obtained output voltage to the signal processing circuit 205. The signal processing circuit 205 can calculate the remaining capacity of the electric double-layer capacitor 204 in accordance with the output voltage and control the display mode of the display devices 101 and 201 in accordance with the remaining capacity.

The signal processing circuit 205 has a function of processing a signal in the electronic device 10. The signal processing circuit 205 has a function of calculating the remaining capacity on the basis of a signal determined by an output voltage obtained from the monitor circuit 225 and controlling the display mode of the display device in accordance with the remaining capacity, a function of controlling the display mode of the display device in accordance with a signal output from a sensor which is separately provided, or other functions.

The signal processing circuit 205 may include a memory circuit which can store data. Alternatively, a memory circuit may be provided outside the signal processing circuit 205, and data may be transmitted and received to and from each circuit in the signal processing circuit 205 through an interface circuit for the memory circuit.

The arithmetic device 231 specifies an address of a sensor, a monitor circuit, a memory device, or the like to read out necessary data, and outputs data obtained by calculation. In the signal processing circuit 205, the interface circuit 232, the interface circuit 233, and the arithmetic device 231 transmit and receive signals to and from each other through the system bus 235.

The arithmetic device 231 is preferably configured to perform power gating by stopping the calculation so that data is not input or output. In the case where this structure is employed, a nonvolatile register is provided to hold data in a register of an arithmetic circuit even when a power supply is stopped. When the arithmetic device includes the nonvolatile register, data can be held from the stop to the restart of the power supply. The nonvolatile register is referred to as a register which can hold data even when the power supply is temporarily stopped.

As the nonvolatile register, a register with a circuit configuration in which a transistor including an oxide semiconductor in a semiconductor layer where a channel is formed (OS transistor) is included is preferable. The OS transistor has an extremely low leakage current in a non-conduction state (off-state current), so that charge can be retained in a floating node when the OS transistor is turned off. The OS transistor and a transistor including silicon in a semiconductor layer (Si transistor) can be stacked; thus, an increase in circuit area due to the OS transistor can be inhibited.

By utilizing a low off-state current of the OS transistor, a memory element of a memory device in the signal processing circuit 205 can have a circuit configuration using the OS transistor. As described above, since the OS transistor can be provided so as to overlap with the Si transistor, a memory element and a driver circuit of the memory element are formed using an OS transistor and a Si transistor, respectively, and are stacked with each other, whereby the circuit area can be reduced.

The interface circuit 232 and the interface circuit 233 each have a function of converting a signal from another circuit in the signal processing circuit 205 into a signal which can be received by the display devices 101 and 201 or a function of receiving a signal output from the display devices 101 and 201 and taking the signal into the signal processing circuit 205. In other words, the interface circuit 232 and the interface circuit 233 each have a function of mediating input and output signals between the arithmetic device 231 and the display devices 101 and 201.

An example of the interface circuit 232 and the interface circuit 233 is a circuit that converts a signal into a signal compatible with interface standards such as DVI, HDMI (registered trademark), eDP, iDP, V-by-One HS, FPD-Link II, or Advanced PPmL.

The display controllers 111 and 211 each have a function of outputting a signal for driving a pixel in accordance with data whose content is to be displayed in the pixel 112 and the pixel 212. Although not illustrated in FIG. 2A, the display devices 101 and 201 include driver circuits for driving the pixels 112 and 212, and the display controllers 111 and 211 can drive the pixels 112 and 212 through the driver circuits.

Next, a structure of the pixel circuit 11, the pixel circuit 12, the liquid crystal element 13, and the light-emitting element 14, which are included in the pixels 112 and 212, is described. The pixel circuit 11 controls the grayscale display of the liquid crystal element 13, whereas the pixel circuit 12 controls the grayscale display of the light-emitting element 14. Note that the liquid crystal element 13 includes a reflective electrode. In the liquid crystal element 13, the intensity of reflected light is adjusted by the reflective electrode to perform grayscale display. In the light-emitting element 14, light emission is adjusted by changing the amount of current flowing between electrodes to perform grayscale display.

The schematic view of the pixel 112 (or the pixel 212) in FIG. 2B illustrates the arrangement of the pixel circuit 11, the pixel circuit 12, the liquid crystal element 13, and the light-emitting element 14. The liquid crystal element 13 illustrated in FIG. 2B includes an opening 15. This opening 15 is provided in the reflective electrode. The light-emitting element 14 illustrated in FIG. 2B is provided to overlap with the opening 15 of the liquid crystal element 13. The pixel circuit 11 and the pixel circuit 12 illustrated in FIG. 2B are provided between a layer including the liquid crystal element 13 and a layer including the light-emitting element 14. Note that the pixel circuit 11 and the pixel circuit 12 in FIG. 2B may be provided in different layers.

In the pixel 112 (or the pixel 212) with the structure illustrated in FIG. 2B, grayscale display can be performed by the control of the intensity of reflected light 16 of the liquid crystal element 13 and the control of the intensity of light 17 emitted from the light-emitting element 14 through the opening 15. Note that the reflected light 16 and the light 17 emitted from the light-emitting element 14 are emitted toward a display surface of the display device 101 (or the display device 201).

In the structure illustrated in FIG. 2B, the circuits for driving the pixels, such as the pixel circuit 11 and the pixel circuit 12, can be arranged under the reflective electrode of the liquid crystal element 13. This prevents a decrease in aperture ratio due to the addition of the pixel circuit 12 for driving the light-emitting element 14.

With the structure illustrated in FIG. 2B, the intensity of reflected light utilizing external light reflected is adjusted by the reflective electrode included in the liquid crystal element to perform grayscale display. This results in improved visibility in outdoor environments of the electronic device provided with the display device including the pixel in FIG. 2B.

Also with the structure illustrated in FIG. 2B, the intensity of the light 17 emitted from the light-emitting element 14 is adjusted to perform grayscale display. This results in improved visibility in indoor environments with a low external light intensity of the electronic device provided with the display device including the pixel in FIG. 2B.

In order to perform display in outdoor environments by the control of the liquid crystal element 13 and perform display in indoor environments by the control of the light-emitting element 14, the sensor capable of measuring illuminance is provided near the display device of the electronic device 10, and the display is switched in accordance with the illuminance obtained by the sensor. Note that in the display device included in the electronic device, at least one of the liquid crystal element and the light-emitting element is controlled to perform grayscale display. Thus, both of the liquid crystal element and the light-emitting element can be controlled to perform grayscale display, which is preferable because the visibility of the display device 10 can be improved as compared with the case where grayscale display is performed with one of the liquid crystal element and the light-emitting element.

In the structure illustrated in FIG. 2B, each pixel includes the pixel circuit 11 for controlling the liquid crystal element 13 and the pixel circuit 12 for controlling the light-emitting element 14. In other words, grayscale display with the liquid crystal element and grayscale display with the light-emitting element can be independently controlled in each pixel. In such a structure, the control with a backlight for concurrently emitting light in a plurality of pixels is not performed, but light emission of the light-emitting element can be controlled in each pixel (minimum unit) in accordance with an image to be displayed, whereby unnecessary light emission can be inhibited. Hence, lower power consumption can be achieved in the electronic device provided with the display device including the pixel in FIG. 2B.

The pixel circuit 11 and the pixel circuit 12 each include a transistor for controlling grayscale display. As the transistor, the OS transistor is preferably used. As described above, the OS transistor has an extremely low off-state current. Thus, when the display device displays a still image, charge corresponding to the image data can be held in the pixel circuit for a long time. With such a structure, the rewriting frequency (refresh operation) of the pixel can be reduced, so that power consumption can be reduced.

The electronic device 10 described above can have improved visibility both in outdoor environments and in indoor environments. In addition, the above-described electronic device 10 can have high convenience, in particular high portability.

<Mode 1 of Electronic Device>

A mode of the electronic device 10 illustrated in FIGS. 1A to 1C and FIGS. 2A and 2B is described with reference to FIGS. 3A to 3C and FIGS. 4A to 4C.

Figure 3A:
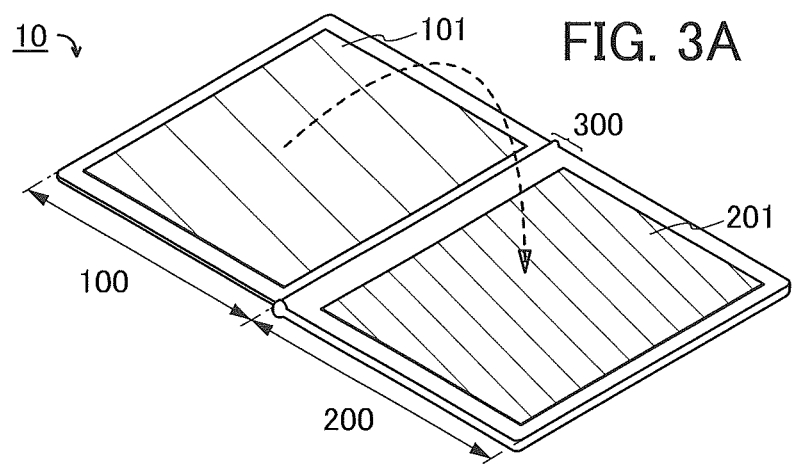
FIGS. 3A to 3C are perspective views illustrating a structure example of an electronic device.
Figure 3B:
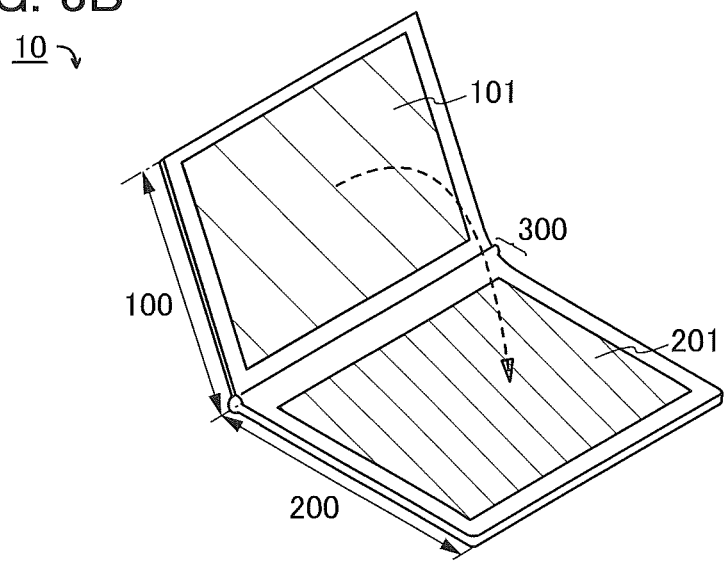
Figure 3C:
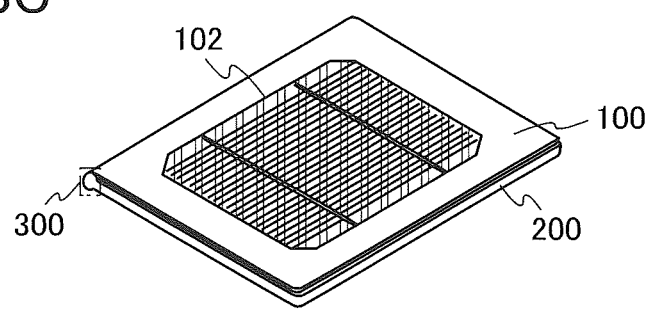

FIGS. 3A to 3C are perspective views illustrating a mode of the electronic device 10 in the case where the solar battery 102 generates power.

For example, the housing 100 is lifted up from the state of the electronic device 10 illustrated in FIG. 3A in the direction expressed by a dotted arrow in the drawing, and the housing 100 is adjusted so that the solar battery provided on the rear surface side of the display surface of the display device 101 is irradiated with external light as illustrated in FIGS. 3B and 3C.

In the state of FIG. 3B, the solar battery 102 provided on the rear surface side of the display surface of the display device 101 can be irradiated with external light and thus generate power while the display surfaces of the display devices 101 and 201 are seen. For example, written image data can be held in the display devices 101 and 201, display can be performed in the state where power consumption associated with rewriting of the image data is stopped, and the electric double-layer capacitor can be charged.

Figure 4A:
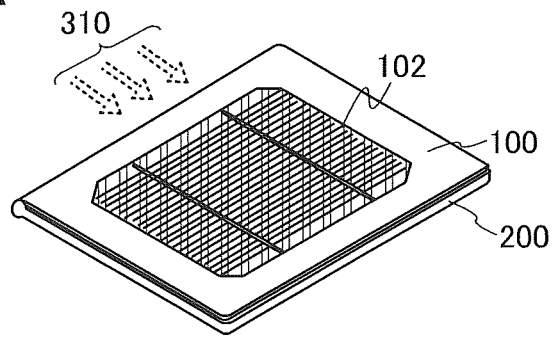
FIGS. 4A to 4C are a perspective view and block diagrams illustrating structure examples of an electronic device.

In the state of FIG. 3C, the solar battery 102 can generate power in the state where the display surfaces of the display devices 101 and 201 are not seen. In the state of FIG. 3C, the electric double-layer capacitor can be charged in the state where power consumption in the display devices 101 and 201 is stopped. FIG. 4A shows a perspective view when the solar battery 102 is irradiated with external light 310 in the state of FIG. 3C.

Figure 4B:
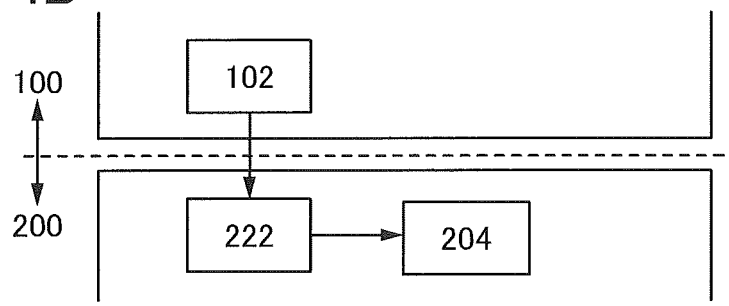

FIG. 4B is a block diagram showing part of FIG. 2A which is used when the electric double-layer capacitor is charged with power generated by irradiating the solar battery 102 with external light.

As illustrated in FIG. 4B, the reverse current prevention circuit 222 and the electric double-layer capacitor 204 are provided on the housing 200, which is different from the housing provided with the solar battery 102. With such a structure, the weight of circuits on the housing 200 side can be increased. Thus, even when the electronic device 10 is handled while the housing 100 is lifted up and a bottom surface of the housing 200 is placed over a support base, the stability can be improved.

Figure 4C:
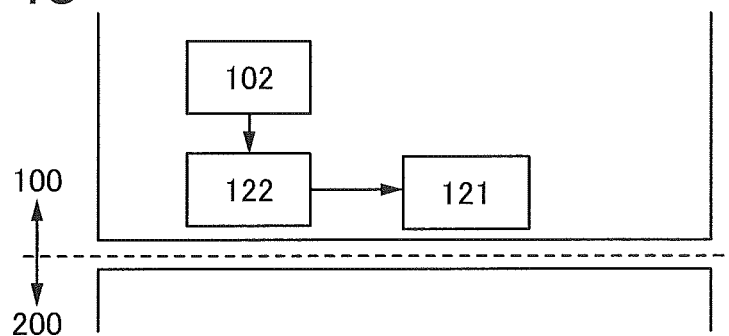

As illustrated in FIG. 4C, in addition to the reverse current prevention circuit 222 and the electric double-layer capacitor 204, a reverse current prevention circuit 122 and an electric double-layer capacitor 121 may be placed on the housing 100 side. Although not illustrated, the same components included in the signal processing circuit and the charge and discharge control circuit and the like provided on the housing 200 side may also be provided on the housing 100 side. As described above, when the electric double-layer capacitor 121, which serves as storage means, is provided, the housing 100 and the housing 200 in the electronic device can be separately used.

<Mode 2 of Electronic Device>

A mode of the electronic device 10 illustrated in FIGS. 1A to 1C and FIGS. 2A and 2B which is different from the mode illustrated in FIGS. 3A to 3C and FIGS. 4A to 4C is described with reference to FIGS. 5A and 5B and FIGS. 6A and 6B.

Figure 5A:
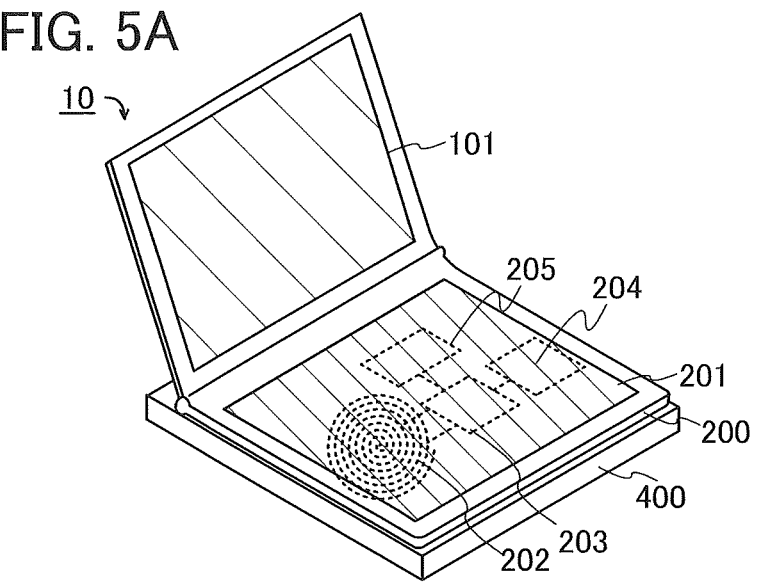
FIGS. 5A and 5B are a perspective view and a block diagram illustrating a structure example of an electronic device.

FIG. 5A is a perspective view illustrating a mode of the electronic device 10 in the case where contactless power feeding is performed.

FIG. 5A illustrates a contactless power feeding device 400 for performing contactless power feeding on the coil 202 on the housing 200 side. Furthermore, FIG. 5A illustrates the coil 202, the charge and discharge control circuit 203, the electric double-layer capacitor 204, and the signal processing circuit 205 in the housing 200 included in the electronic device 10 illustrated in FIGS. 1A to 1C and FIGS. 2A and 2B. The electronic device 10 can be subjected to contactless power feeding by placing the housing 200, which includes the coil 202, over the contactless power feeding device 400.

In the state of FIG. 5A, the electric double-layer capacitor 204 can be charged through the coil 202 provided on the housing 200 side while the display surfaces of the display devices 101 and 201 are seen. For example, written image data can be held in the display devices 101 and 201, display can be performed in the state where power consumption associated with rewriting of the image data is stopped, and the electric double-layer capacitor can be charged.

The state of the electronic device 10 is not limited to the state of FIG. 5A. As illustrated in FIG. 3C, the electronic device 10 may be closed and placed over the contactless power feeding device 400, in which case the charge by power generation of the solar battery and the charge of the electric double-layer capacitor 204 can be performed concurrently.

Figure 5B:
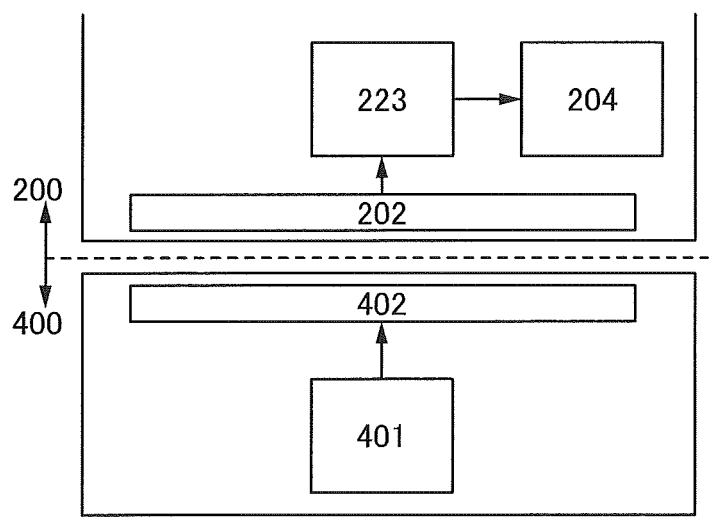

FIG. 5B is a block diagram illustrating a structure of charging the electric double-layer capacitor 204 using the contactless power feeding device 400. As illustrated in FIG. 5B, the contactless power feeding device 400 includes an AC power 401 and a coil 402. FIG. 5B illustrates the coil 202, the rectifying and smoothing circuit 223, and the electric double-layer capacitor 204 as the components on the housing 200 side.

As illustrated in FIG. 5B, the contactless power feeding device 400 can transmit power wirelessly by using electromagnetic induction generated between the coil 202 and the coil 402 by letting current flow through the coil 402 with the use of the power of the AC power 401. Since power received by the coil 202 is an AC signal, after being rectified and smoothed by the rectifying and smoothing circuit 223, the power can be stored in the electric double-layer capacitor 204.

The electric double-layer capacitor 204 is charged by accumulating charge and is discharged by releasing charge. Thus, in the case where voltage output from the electric double-layer capacitor 204 is supplied to each circuit in the electronic device 10, such as the display device 101, the display device 201, and the signal processing circuit 205, the voltage needs to be converted into stable voltage.

Figure 6A:
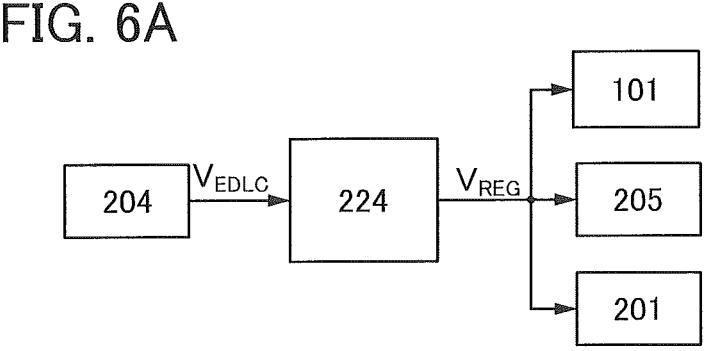
FIGS. 6A and 6B are a block diagram and a circuit diagram illustrating a structure example of an electronic device.

FIG. 6A is a block diagram illustrating supply of voltage from the electric double-layer capacitor 204 to each circuit in the electronic device 10. FIG. 6A illustrates the electric double-layer capacitor 204 and the stabilization circuit 224 in addition to the circuits in the electronic device 10, such as the display device 101, the display device 201, and the signal processing circuit 205.

The stabilization circuit 224 has a function of converting output voltage $V_{EDLC}$ of the electric double-layer capacitor 204, which is changed in accordance with the remaining capacity, into stabilized voltage $V_{REG}$. As the stabilization circuit 224, a circuit which can raise input voltage and output the raised voltage like a boosting circuit is preferably used.

Figure 6B:
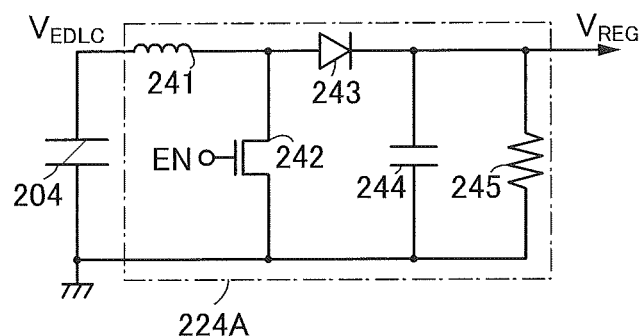

FIG. 6B shows a circuit diagram of a step-up switching regulator 224A as an example of the stabilization circuit 224. The switching regulator 224A includes an inductor 241, a transistor 242, a diode 243, a capacitor 244, and a resistor 245. A control signal EN which is determined by the value of the voltage $V_{REG}$ is supplied to a gate of the transistor 242.

Note that the voltage $V_{REG}$ generated in the stabilization circuit 224 is preferably raised or lowered to a voltage needed for circuits in the electronic device 10. With such a structure, the stabilization circuit 224 does not necessarily generate a plurality of voltages needed for circuits in the electronic device 10. Thus, a reduction in circuit area of the stabilization circuit 224 can be achieved.

<Operation Mode of Electronic Device>

An operation mode of an electronic device is described with reference to FIGS. 7A to 7C, FIGS. 8A to 8C, and FIGS. 9A to 9F.

The electronic device 10 can switch an operation mode in accordance with the remaining capacity of the electric double-layer capacitor. A block diagram of FIG. 7A shows the electric double-layer capacitor 204, the monitor circuit 225, and the arithmetic device 231.

Figure 7A:
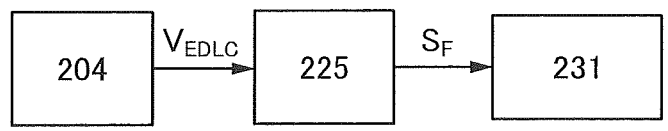
FIGS. 7A to 7C are a block diagram, a graph, and a flow chart illustrating a structure example of an electronic device.

In FIG. 7A, the monitor circuit 225 has a function of generating a signal $S_F$ in accordance with the output voltage $V_{EDLC}$ of the electric double-layer capacitor 204. As the monitor circuit 225, for example, an analog-to-digital converter circuit which can convert the signal $S_F$, which is a digital signal, into the output voltage $V_{EDLC}$, which is an analog voltage, can be used. The arithmetic device 231 has a function of switching a display mode in accordance with the signal $S_F$.

Figure 7B:
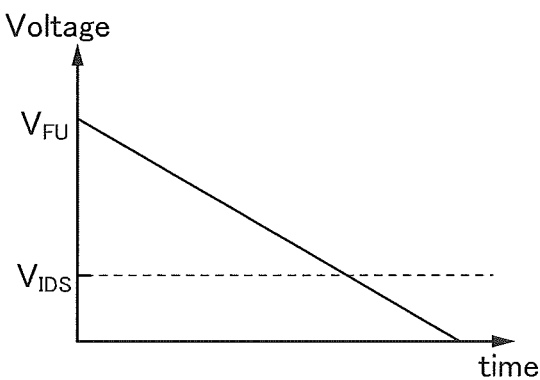

FIG. 7B is a graph showing a change in voltage value of the output voltage $V_{EDLC}$ over time in the electric double-layer capacitor 204. In FIG. 7B, the output voltage $V_{EDLC}$ at maximum remaining capacity is represented as voltage $V_{FU}$, and the output voltage $V_{EDLC}$ which is lowered from the voltage $V_{FU}$ by a change of the remaining capacity due to power consumption after a certain period has passed is represented as voltage $V_{IDS}$.

Figure 7C:
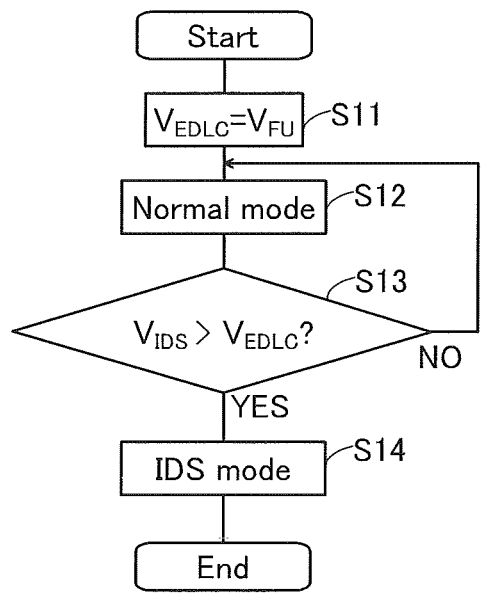

FIG. 7C shows an example of a flow chart showing a change of the display mode of the display devices 101 and 201 in accordance with a change in the output voltage $V_{EDLC}$ of the electric double-layer capacitor 204. As the possible display modes of the display devices 101 and 201, a normal driving mode (Normal mode) with a normal frame frequency and an idling stop (IDS) driving mode with a low frame frequency will be described below.

Note that the idling stop (IDS) driving refers to a method in which after image data is written, rewriting of image data is stopped. This increases the interval between writing of image data and subsequent writing of image data, thereby reducing the power that would be consumed by writing of image data in that interval.

The aforementioned normal driving mode and idling stop (IDS) driving mode will be described with reference to FIGS. 8A to 8C as examples.

Figure 8A:
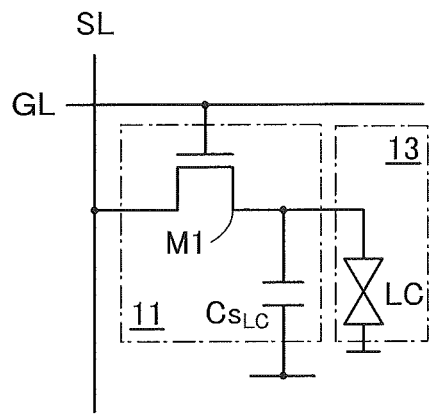
FIGS. 8A to 8C are a circuit diagram illustrating a structure example of an electronic device and timing charts of two driving modes.

FIG. 8A is a circuit diagram of a pixel including the liquid crystal element 13 and the pixel circuit 11. FIG. 8A illustrates a transistor M1 connected to a signal line SL and a gate line GL, a capacitor $Cs_{LC}$, and the liquid crystal element LC.

Figure 8B:
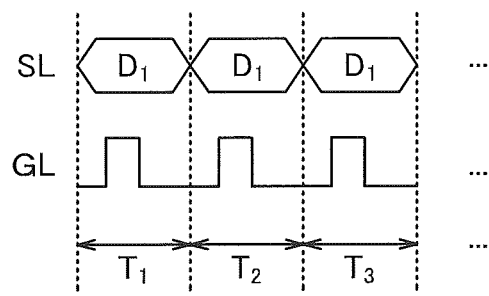

FIG. 8B is a timing chart showing waveforms of signals supplied to the signal line SL and the gate line GL in the normal driving mode. In the normal driving mode, a normal frame frequency (e.g., 60 Hz) is used for operation. In the case where one frame period is divided into periods $T_1$ to $T_3$, a scanning signal is supplied to the gate line in each frame period and data $D_1$ of the signal line is written to the pixel. This operation is performed both to write the same data $D_1$ in the periods $T_1$ to $T_3$ and to write different data in the periods $T_1$ to $T_3$.

Figure 8C:
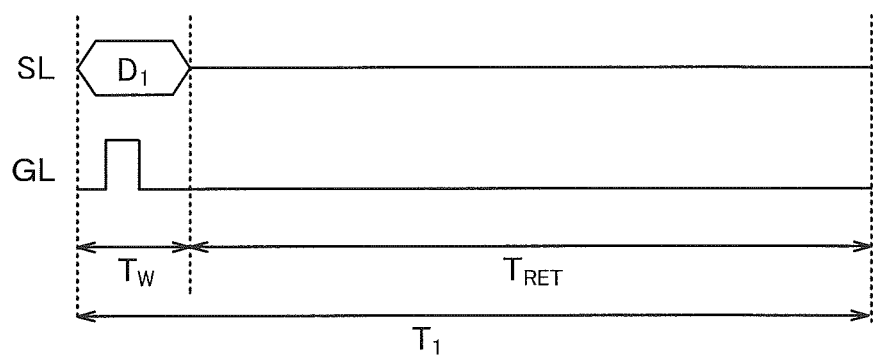

In contrast, FIG. 8C is a timing chart showing waveforms of signals supplied to the signal line SL and the gate line GL in the idling stop (IDS) driving. In the idling stop (IDS) driving, a low frame frequency (e.g., 1 Hz) is used for operation. One frame period is denoted by a period $T_1$ and includes a data writing period $T_W$ and a data retention period $T_{RET}$. In the idling stop (IDS) driving, a scanning signal is supplied to the gate line and the data $D_1$ of the signal line is written to the pixel in the period $T_W$, the gate line is fixed to a low-level voltage in the period $T_{RET}$, and the transistor M1 is turned off so that the written data $D_1$ is retained in the pixel.

FIG. 7C shows a flow chart in the case where the display mode is switched between the normal driving mode and the idling stop (IDS) driving mode.

In the flow chart in FIG. 7C, first, the output voltage $V_{EDLC}$ becomes the voltage $V_{FU}$ (Step S11). This indicates that the electric double-layer capacitor 204 holds sufficient remaining capacity. In this state, the display device is controlled to be in the normal driving mode (Step S12).

Next, the output voltage $V_{EDLC}$ is obtained in the monitor circuit 225, and on the basis of the signal $S_F$ which corresponds to the obtained output voltage $V_{EDLC}$, whether the output voltage $V_{EDLC}$ is below the voltage $V_{IDS}$ is determined (Step S13). In the state where the output voltage $V_{EDLC}$ is sufficiently high and sufficient remaining capacity is held, Step S12, which is the normal driving mode, is continued. In the case where the output voltage $V_{EDLC}$ is below the voltage $V_{IDS}$, the display device is controlled to be in the idling stop (IDS) driving mode (Step S14).

In this manner, the display mode can be switched in accordance with the remaining capacity of the electric double-layer capacitor. In particular, with the structure of one embodiment of the present invention in which the electric double-layer capacitor is included as a power storage device, switching of the display mode is possible in accordance with the accurate remaining capacity as compared with the structure including the secondary battery. An electronic device in which power consumption of the display device can be reduced because the remaining capacity can be estimated accurately can be used for a longer period, so that the convenience can be improved.

Figure 9A:
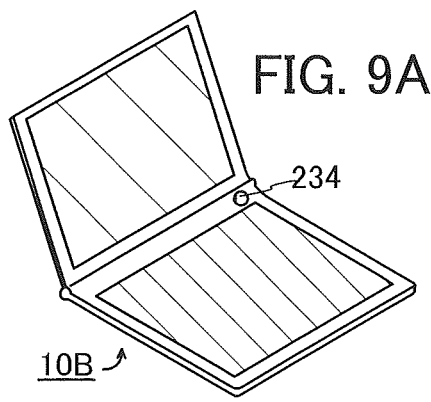
FIGS. 9A to 9F are a perspective view, a block diagram, schematic views, and a state transition diagram illustrating a structure example of an electronic device.

Furthermore, the operation mode of the electronic device 10 can be switched in accordance with the surrounding illuminance. FIG. 9A is a perspective view showing an example of an electronic device 10B which is provided with a sensor 234 having a function of measuring illuminance.

The electronic device 10B can switch the operation mode in accordance with a signal including information on the illuminance obtained by the sensor 234. A block diagram in FIG. 9B illustrates the sensor 234 and the arithmetic device 231.

Figure 9B:
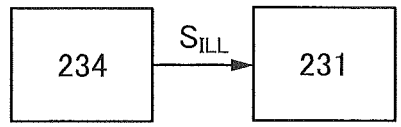

The sensor 234 in FIG. 9B has a function of, for example, generating a signal $S_{ILL}$ based on the illuminance. The arithmetic device 231 has a function of switching the display mode in accordance with the signal $S_{ILL}$.

Figure 9C:
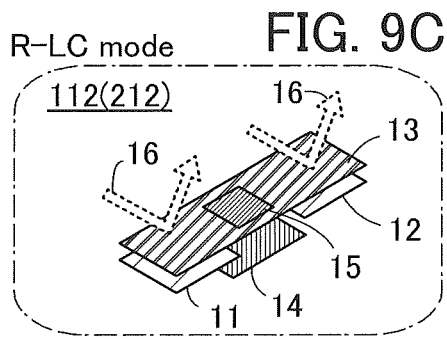
Figure 9D:
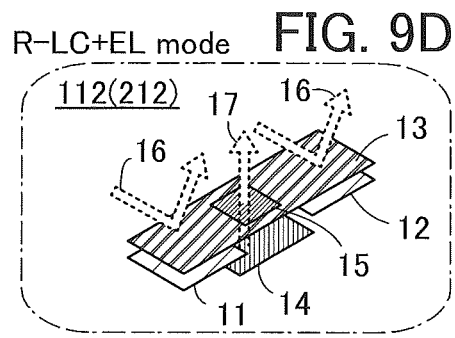
Figure 9E:
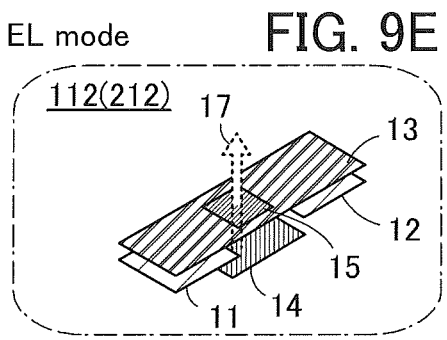

FIGS. 9C to 9E are schematic views of a pixel illustrating possible display modes which can be obtained by the display device in accordance with illuminances. In FIGS. 9C to 9E, as in FIG. 2B, the pixel circuit 11, the pixel circuit 12, the liquid crystal element 13, the light-emitting element 14, the opening 15, the reflected light 16 reflected on the reflective electrode included in the liquid crystal element 13, and the light 17 emitted from the light-emitting element 14 through the opening 15 are illustrated.

As the possible display modes of the display devices 101 and 201, a reflective liquid crystal display mode (R-LC mode), a reflective liquid crystal+EL display mode (R-LC+EL mode), and an EL display mode (EL mode) will be described as illustrated in FIGS. 9C to 9E.

In the reflective liquid crystal display mode, grayscale display is performed by adjusting the intensity of reflected light with the liquid crystal element included in the pixel. Specifically, as shown in the schematic diagram of the pixel in FIG. 9C, the intensity of the reflected light 16 reflected on the reflective electrode of the liquid crystal element 13 is adjusted, whereby grayscale display is performed.

In the reflective liquid crystal+EL display mode (R-LC+EL mode), grayscale display is performed by adjusting both the intensity of reflected light and the intensity of light emitted from the light-emitting element with the liquid crystal element and the light-emitting element. Specifically, as shown in the schematic diagram of the pixel in FIG. 9D, the intensity of the reflected light 16 reflected on the reflective electrode of the liquid crystal element 13 and the intensity of the light 17 emitted from the light-emitting element 14 through the opening 15 are adjusted to perform grayscale display.

In the EL display mode (EL mode), grayscale display is performed by adjusting the intensity of light with the light-emitting element. Specifically, as shown in the schematic diagram of the pixel in FIG. 9E, the intensity of the light 17 emitted from the light-emitting element 14 through the opening 15 is adjusted to perform grayscale display.

Figure 9F:
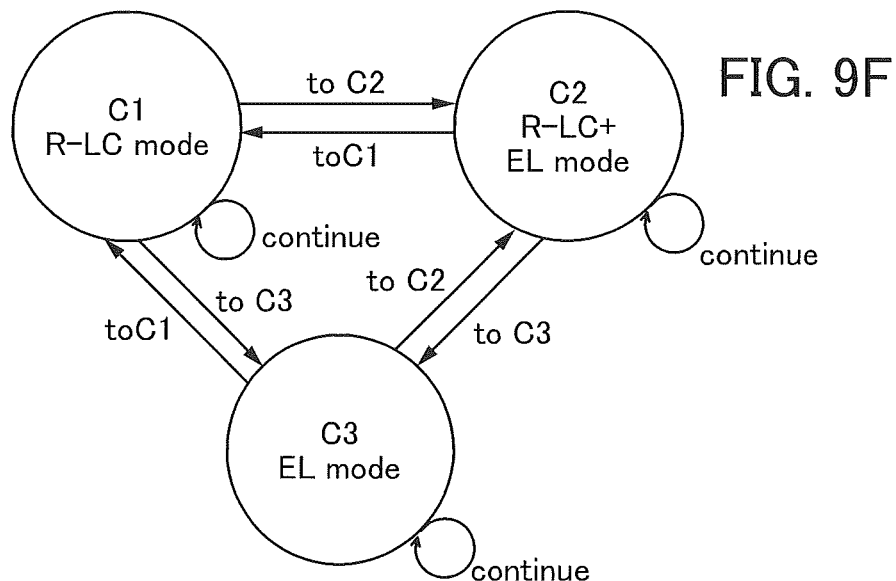

FIG. 9F shows a state transition diagram of the aforementioned three modes (the reflective liquid crystal display mode, the reflective liquid crystal+EL display mode, and the EL display mode). A state C1, a state C2, and a state C3 represent the reflective liquid crystal display mode, the reflective liquid crystal+EL display mode, and the EL display mode, respectively.

As shown in FIG. 9F, any of the display modes can be selected with illuminance in the states C1 to C3. For example, under a high illuminance such as in outdoor environments, the state can be brought into C1. In the case where the illuminance decreases as from outdoors to indoors, the state C1 transfers to the state C3. In the case where a high illuminance is obtained even indoors so that grayscale display can be performed with reflected light, the state C3 transfers to the state C2.

The above structure of switching the display mode with illuminance contributes to a reduction in the frequency of grayscale display with the intensity of light emitted from the light-emitting element, which requires a relatively high power consumption. Accordingly, the power consumption of the electronic device can be reduced. The reflective liquid crystal display mode or reflective liquid crystal+EL display mode is combined with the aforementioned idling stop (IDS) driving mode, in which case power consumption can be further reduced.

<Structure Example of Electronic Device Provided with Touch Sensor>

A structure example of an electronic device provided with a touch sensor in each of the display devices 101 and 201 illustrated in FIGS. 1A to 1C and FIGS. 2A and 2B is described with reference to FIGS. 10A to 10C.

Figure 10A:
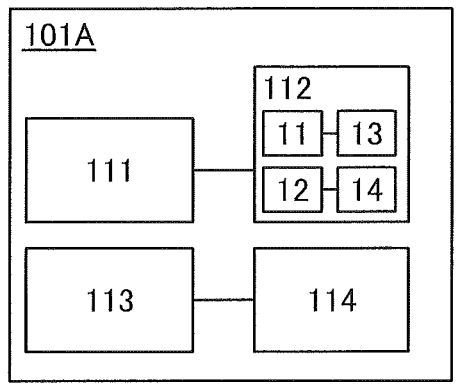
FIGS. 10A to 10C are block diagrams and a perspective view illustrating a structure example of an electronic device.
Figure 10B:
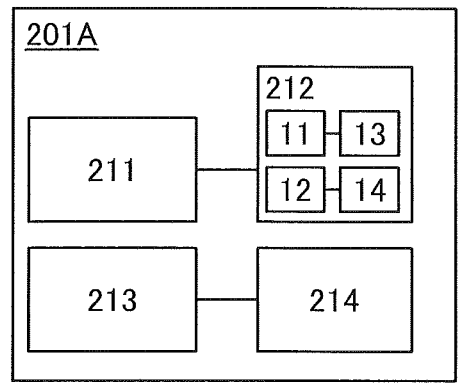

FIG. 10A shows an example of a block diagram of a display device 101A obtained by providing a touch sensor in the display device 101. Similarly, FIG. 10B shows an example of a block diagram of a display device 201A obtained by providing a touch sensor in the display device 201.

In FIG. 10A, the display device 101A includes a touch sensor controller 113 and a touch sensor 114 in addition to the same components of the display device 101 illustrated in FIGS. 2A and 2B. Similarly, in FIG. 10B, the display device 201A includes a touch sensor controller 213 and a touch sensor 214 in addition to the same components of the display device 201 illustrated in FIGS. 2A and 2B.

As the touch sensor 114 and the touch sensor 214, other than a capacitive touch sensor, a resistive touch sensor, an ultrasonic touch sensor, an optical touch sensor, or the like can be used. When the optical touch sensor is used, an optical sensor element can be formed over the same substrate as the transistor included in the pixel. Thus, the manufacturing cost can be reduced.

Figure 10C:
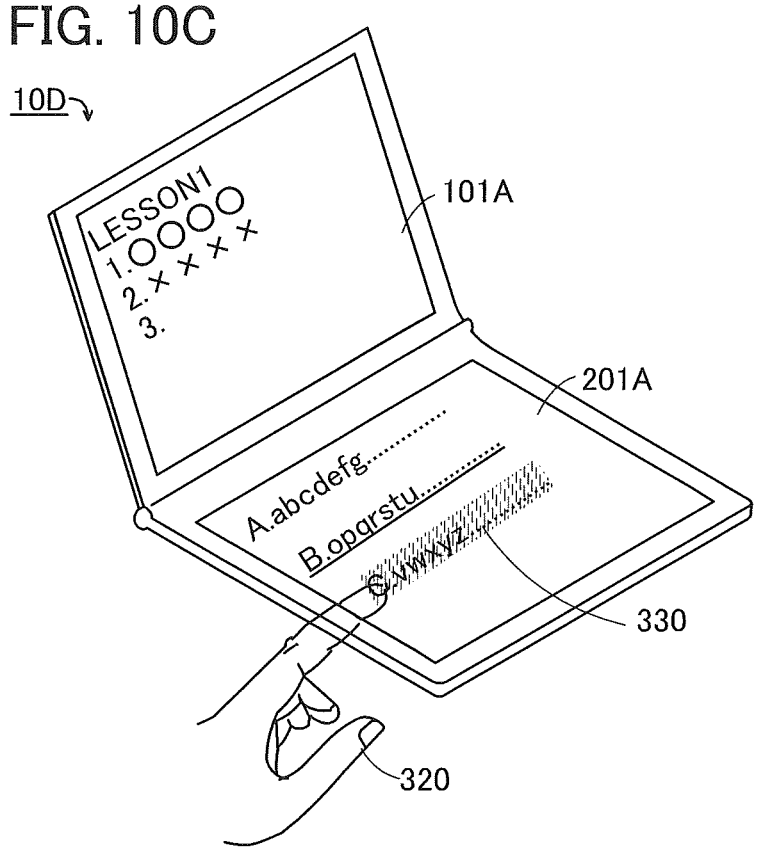

FIG. 10C shows an example of a usage mode of an electronic device including a display device which has a function of sensing an object with a touch sensor. FIG. 10C illustrates an electronic device 10D including the display device 101A and the display device 201A. In addition, FIG. 10C illustrates an object 320, and for example, when a letter displayed on the display device 201A is traced with the object 320, a marker 330 can be drawn.

MODIFICATION EXAMPLE OF ELECTRONIC DEVICE

An electronic device 10A, an electronic device 10B, an electronic device 10C, and an electronic device 10D, each of which has a structure different from that of the electronic device 10, are described with reference to drawings. In order to avoid repeated description, the description is mainly given on portions different from those of the electronic device 10. For the components not particularly described below, this specification or the like is referred to.

Modification Example 1: Electronic Device 10A

Figure 11A:
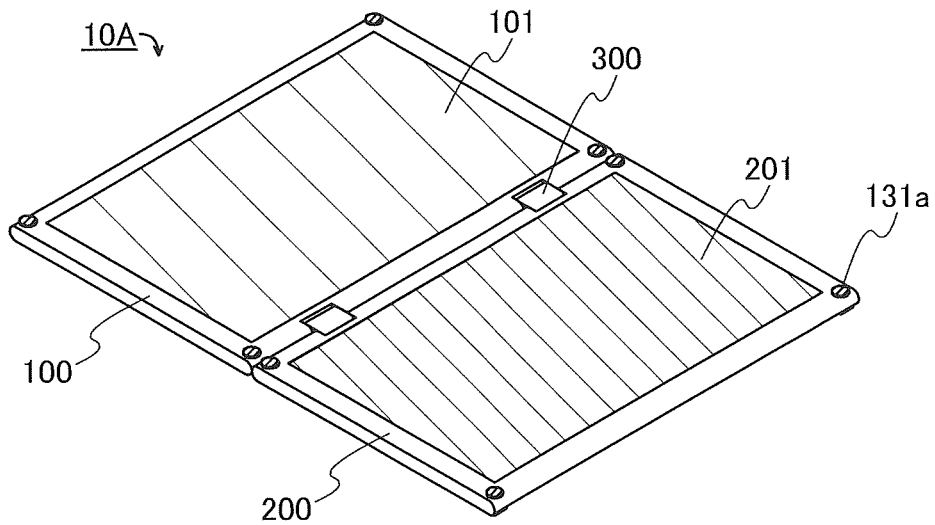
FIGS. 11A to 11C are perspective views illustrating a structure example of an electronic device.
Figure 11B:
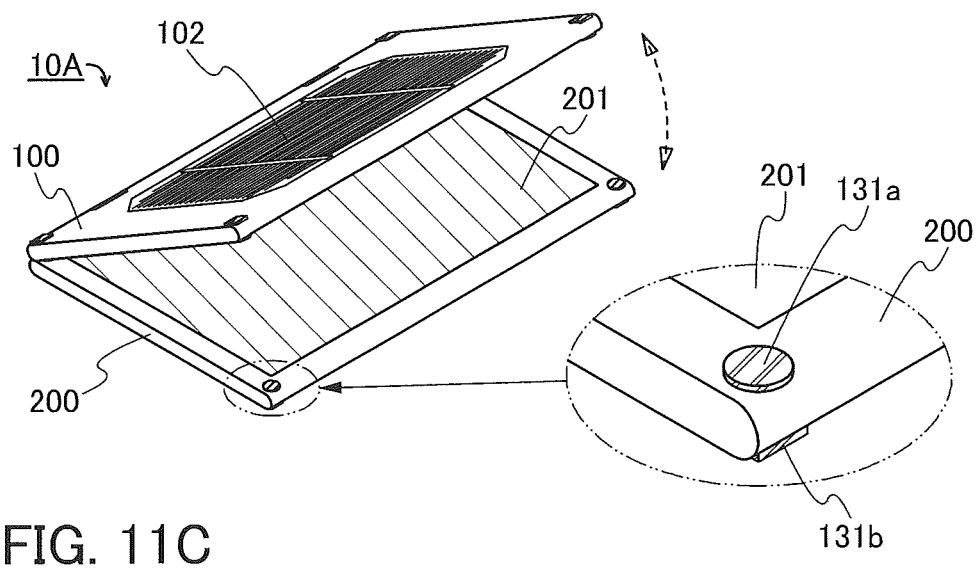
Figure 11C:
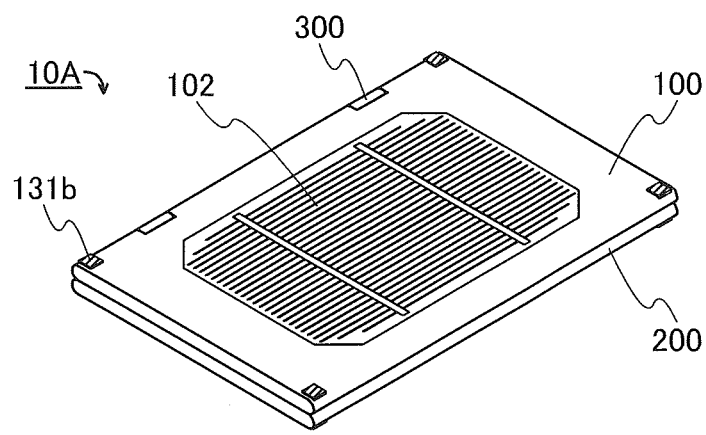
Figure 12A:
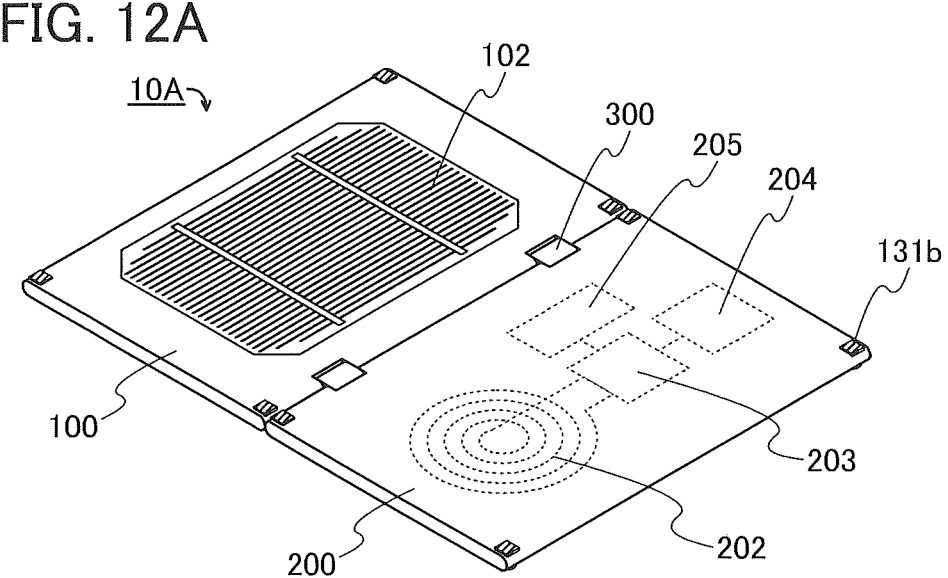
FIGS. 12A to 12C are perspective views illustrating a structure example of an electronic device.
Figure 12B:
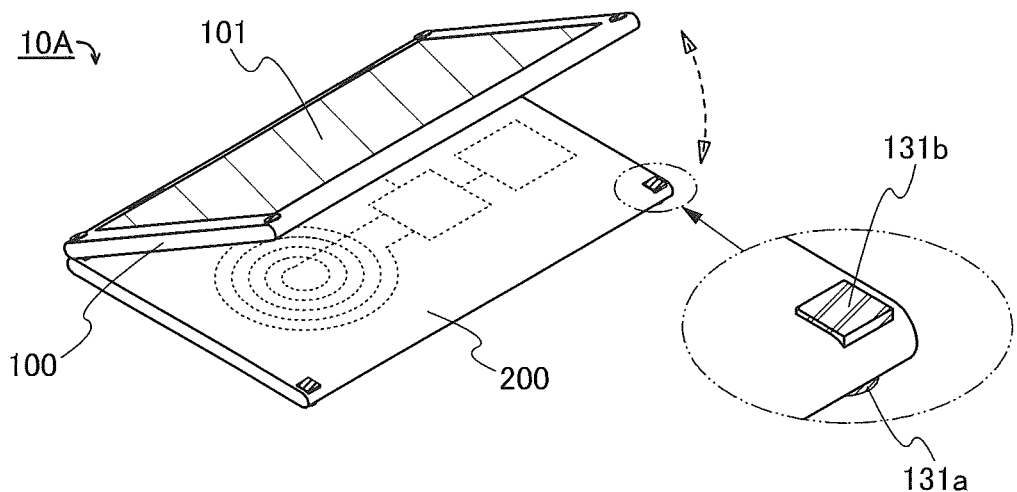
Figure 12C:
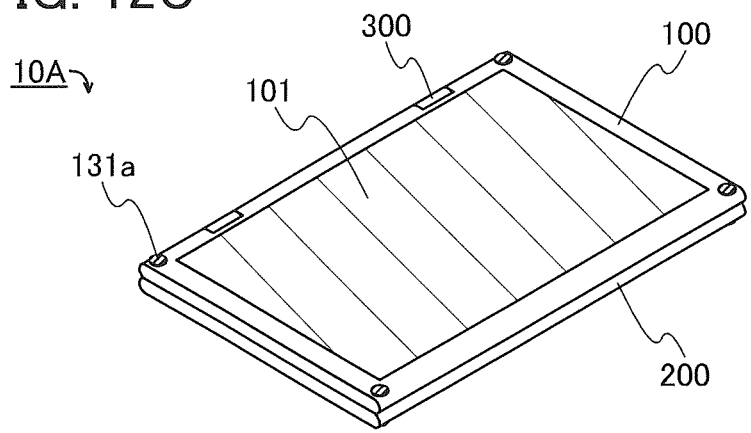

FIG. 11A is a perspective view seen from one surface (a front surface) side of the electronic device 10A. FIG. 12A is a perspective view seen from the other surface (a rear surface) side of the electronic device 10A. FIGS. 11B, 11C, 12B, and 12C show examples of the electronic device 10A which is changed in form.

The electronic device 10A includes, like the electronic device 10, the housing 100 and the housing 200. The housing 100 includes the display device 101 on the front surface side and the solar battery 102 on the rear surface side. The housing 200 includes the display device 201 on the front surface side. The housing 200 includes the coil 202, the charge and discharge control circuit 203, the electric double-layer capacitor 204, and the signal processing circuit 205 inside.

The electronic device 10A includes a hinge portion 300. The electronic device 10A can be folded so that a front surface side of the housing 100 and a front surface side of the housing 200 face each other using the hinge portion 300 as a pivot. In other words, the electronic device 10A can be folded so that a display surface of the display device 101 and a display surface of the display device 201 face each other (see FIG. 11C). Moreover, the electronic device 10A can be folded so that a rear surface side of the housing 100 and a rear surface side of the housing 200 face each other (see FIG. 12C).

The electronic device 10A is provided with structure bodies 131a on the front surface sides of the housing 100 and the housing 200. In the electronic device 10A, the structure bodies 131a are provided at four corners of the front surface side of the housing 100 and four corners of the front surface side of the housing 200, that is, at eight portions in total. In addition, the electronic device 10A is provided with structure bodies 131b on the rear surface sides of the housing 100 the housing 200. In the electronic device 10A, the structure bodies 131b are provided at four corners of the rear surface side of the housing 100 and four corners of the rear surface side of the housing 200, that is, at eight portions in total.

Examples of a material used for the structure body 131a and the structure body 131b include a resin material (a high-molecular material) such as rubber or plastic. For example, for the structure body 131, fluororesin, an acrylic resin, polyimide, or the like can be used. In particular, an elastic material such as natural rubber or synthetic rubber is preferably used for the structure body 131a and the structure body 131b. Specifically, for the structure body 131a and the structure body 131b, an elastic material with Young's modulus greater than or equal to 1 MPa and less than or equal to 1 GPa, preferably greater than or equal to 1 MPa and less than or equal to 500 MPa, further preferably greater than or equal to 1 MPa and less than or equal to 100 MPa is used.

The structure bodies 131a and 131b are changed in form due to impact when the electronic device 10A is folded. When the structure bodies 131a and 131b are changed in form, the impact applied to the housing can be relieved. Thus, when Young's moduli of the structure bodies 131a and 131b are too high, the structure bodies 131a and 131b are not easily changed in form, so that an effect of relieving impact is not easily obtained. In contrast, when Young's moduli of the structure bodies 131a and 131b are too low, the structure bodies 131a and 131b are largely changed in form, so that an effect of relieving impact is not easily obtained as well.

When the structure bodies 131a and 131b with appropriate Young's moduli are provided for the electronic device 10A, impact by folding the electronic device 10A can be relieved and damage of the electronic device 10A can be prevented. Thus, the reliability of the electronic device 10A can be increased.

To the structure bodies 131a and 131b, one kind or a plurality of kinds of magnetic materials such as an alnico magnet, a ferrite magnet, a samarium cobalt magnet, a neodymium-iron-boron magnet, and a samarium-iron-nitrogen magnet may be mixed.

For example, the structure body 131a on the housing 100 and the structure body 131a on the housing 200 are placed to overlap with each other when the electronic device 10A is folded, and a material containing a magnetic material is used for the structure body 131a, whereby the electronic device 10A can be folded without failure. In addition, the folded electronic device 10A can be prevented from being opened unintentionally. The same applies to the structure body 131b.

Figure 13:
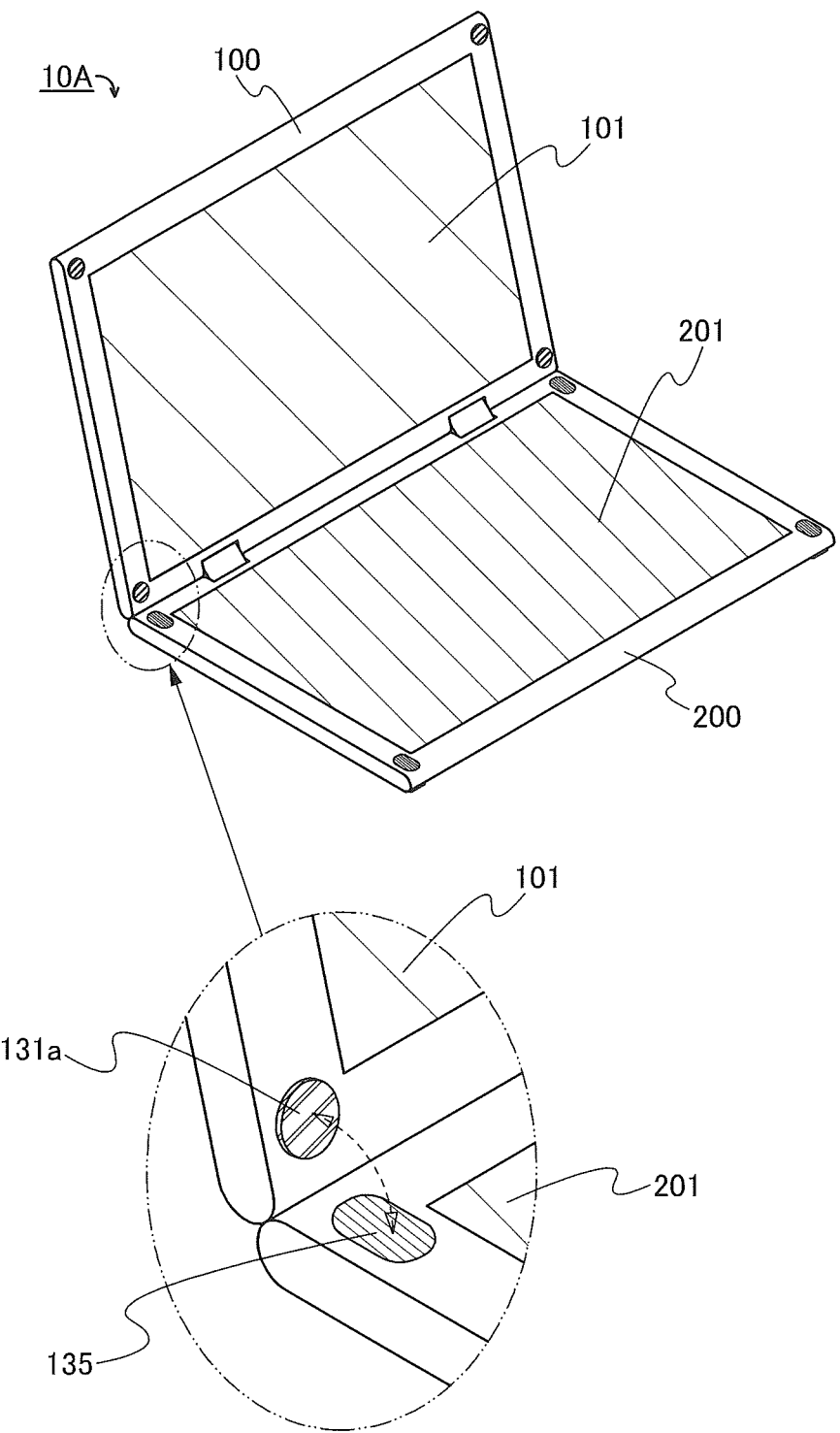
FIG. 13 is a perspective view illustrating a structure example of an electronic device.

One of the structure body 131a on the housing 100 and the structure body 131a on the housing 200, which make a pair when the electronic device 10A is folded can be replaced with a suction portion 135 which can suction a magnet (see FIG. 13). In the case where the housing 100 and/or the housing 200 contains a material which can suction a magnet, one of the structure body 131a on the housing 100 and the structure body 131a on the housing 200 is not necessarily provided. The same applies to the structure body 131b.

Figure 14A:
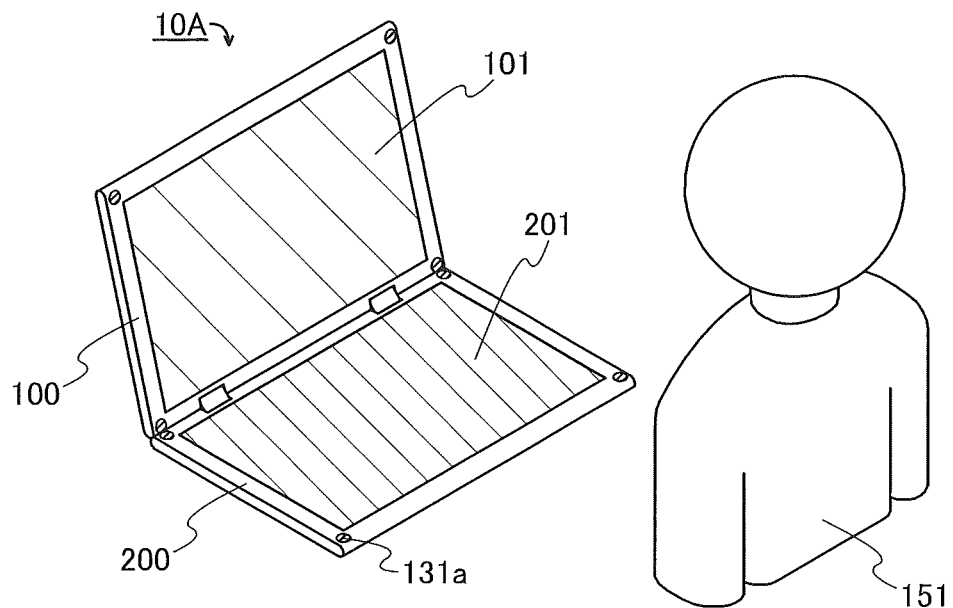
FIGS. 14A and 14B are perspective views illustrating a structure example of an electronic device.
Figure 14B:
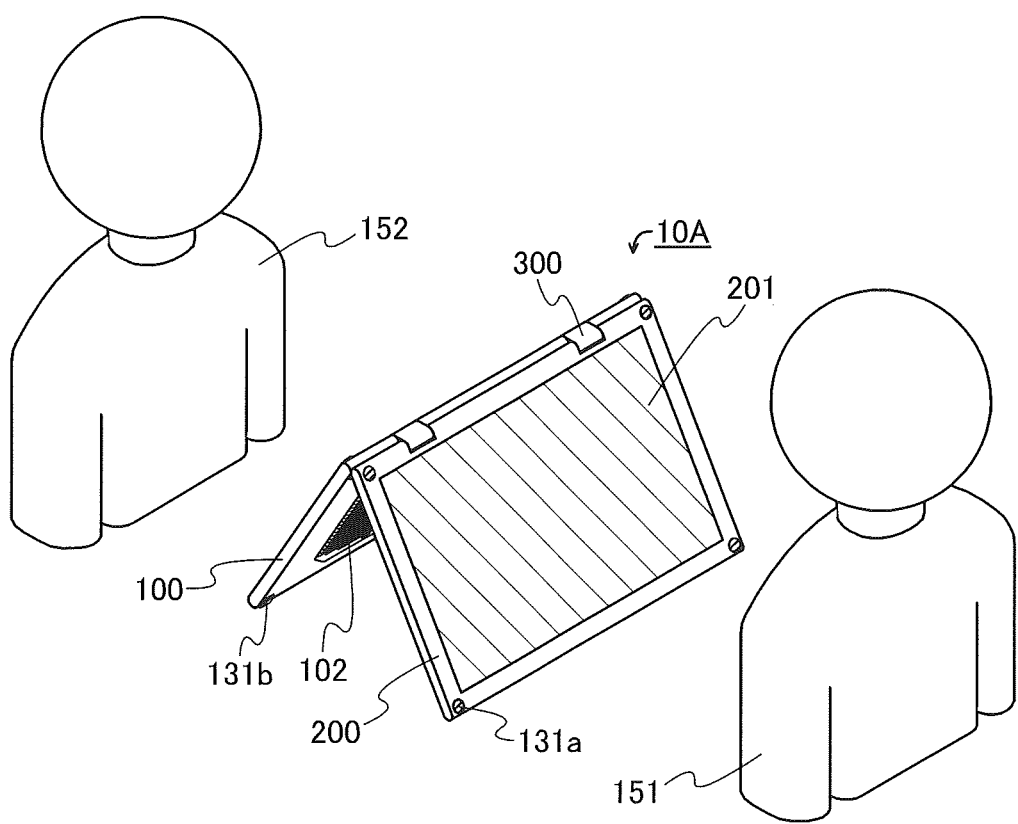

FIGS. 14A and 14B show a usage example of the electronic device 10A. In the electronic device 10A, an angle between the display device 101 and the display device 201 can be adjusted. Thus, the display device 101 and the display device 201 can be placed at an angle a user 151 desires (see FIG. 14A). When the display device 101 and the display device 201 are placed so that back surfaces thereof face each other, the user 151 and a user 152 can use the electronic device 10A at the same time (see FIG. 14B). FIG. 14B shows an example of a state where the user 151 uses the display device 201 and the user 152 uses the display device 101.

Modification Example 2: Electronic Device 10B

Figure 15A:
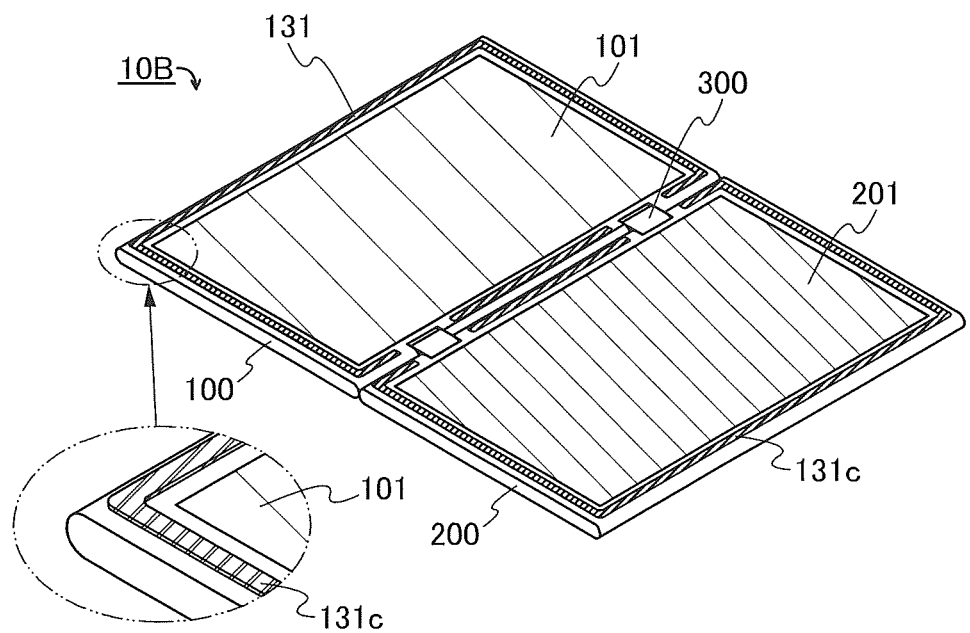
FIGS. 15A and 15B are perspective views illustrating a structure example of an electronic device.
Figure 15B:
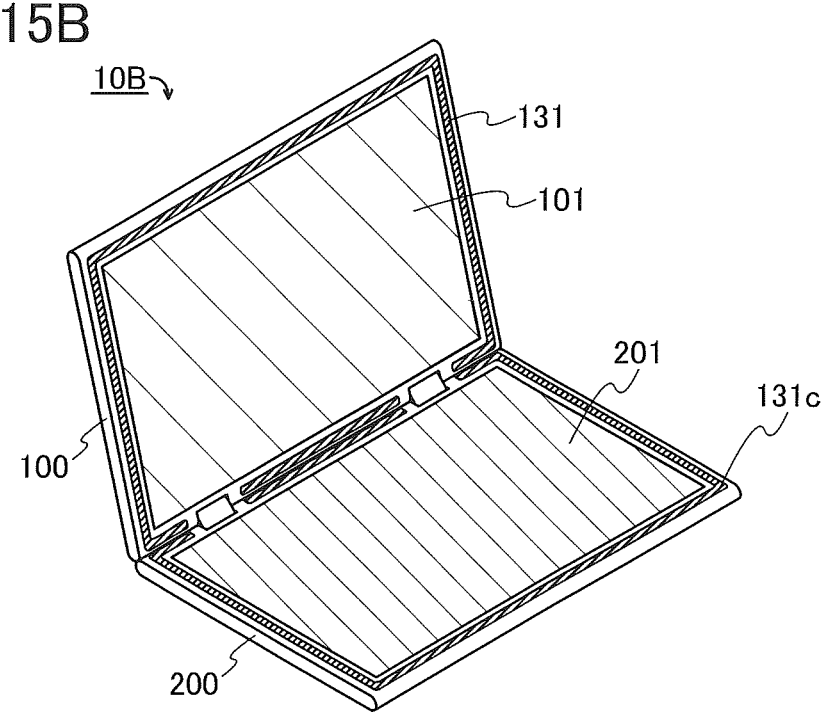

FIG. 15A is a perspective view seen from one surface (a front surface) side of the electronic device 10B. FIG. 15B shows an example of the electronic device 10B which is changed in form.

The shapes of the structure bodies 131a and 131b are not particularly limited. For example, the shapes of the structure bodies 131a and 131b may be circular, elliptical, rectangular, polygonal, or the like when seen in the plan view. Alternatively, the structure bodies 131a and 131b may each have a shape in which a curve line and a straight line are combined.

As illustrated in FIGS. 15A and 15B, a linear structure body 131c may be provided along an outer edge of the housing 100 on the front surface side. Similarly, the linear structure body 131c may be provided along an outer edge of the housing 200 on the front surface side. Although not illustrated, the structure body 131c may be provided on the rear surface sides of the housing 100 and the housing 200. When the placement area of the structure body 131c is increased, an effect of relieving impact when the electronic device 10A is folded can be enhanced. Furthermore, when the placement area of the structure body 131c containing a magnet material is increased, an effect of preventing the folded electronic device 10A from being opened unintentionally can be enhanced. The structure body 131c can be formed using a material similar to those for the structure bodies 131a and 131b.

Modification Example 3: Electronic Device 10C

Figure 16A:
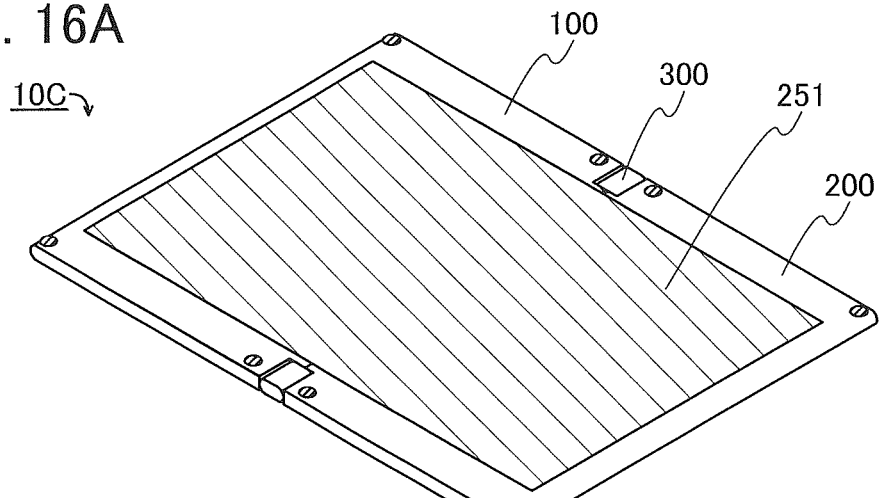
FIGS. 16A to 16C are perspective views illustrating a structure example of an electronic device.
Figure 16B:
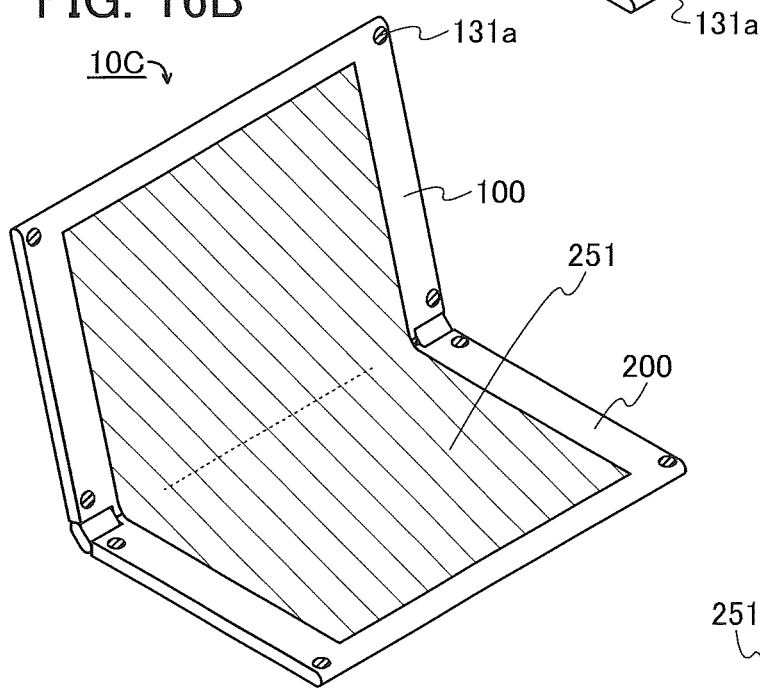
Figure 16C:
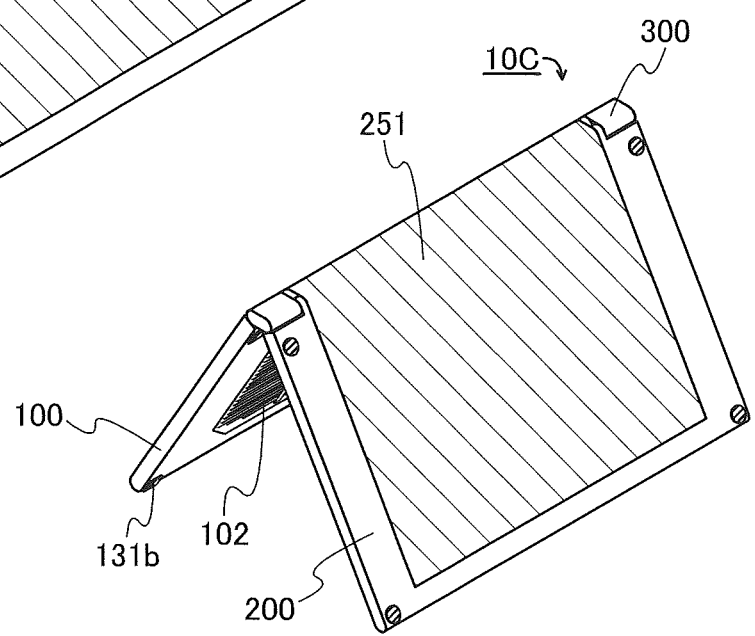

FIG. 16A is a perspective view seen from one surface (a front surface) side of the electronic device 10C. FIGS. 16B and 16C show examples of the electronic device 10C which is changed in form.

When a display device is provided in each of the housings 100 and 200 and an image is displayed in the state where an electronic device is opened, a cut is provided in the image displayed on a display region. Thus, in the electronic device 10C, instead of the display device 101 and the display device 201, a display device 251 that extends over the housing 100 and the housing 200 is provided. As a result, the display device 251 includes a region overlapping with the housing 100 and a region overlapping with the housing 200.

The display device 251 has flexibility. Since the display device 251 has flexibility, the display device 251 can be provided across a region between the housing 100 and the housing 200. Moreover, the display device is not easily damaged even when the electronic device 10C is folded. In addition, even when an image is displayed in the state where the electronic device 10C is opened, the display region is not cut, so that the display quality can be improved.

Modification Example 4: Electronic Device 10D

Figure 17A:
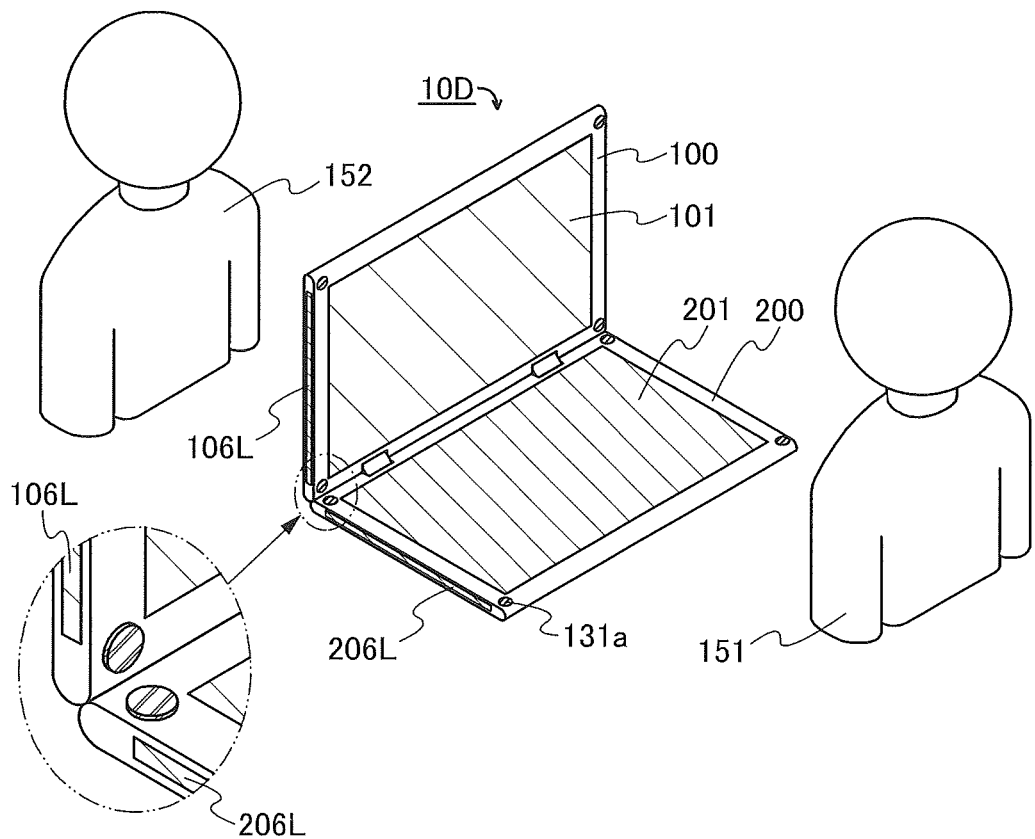
FIGS. 17A and 17B are perspective views illustrating a structure example of an electronic device.
Figure 17B:
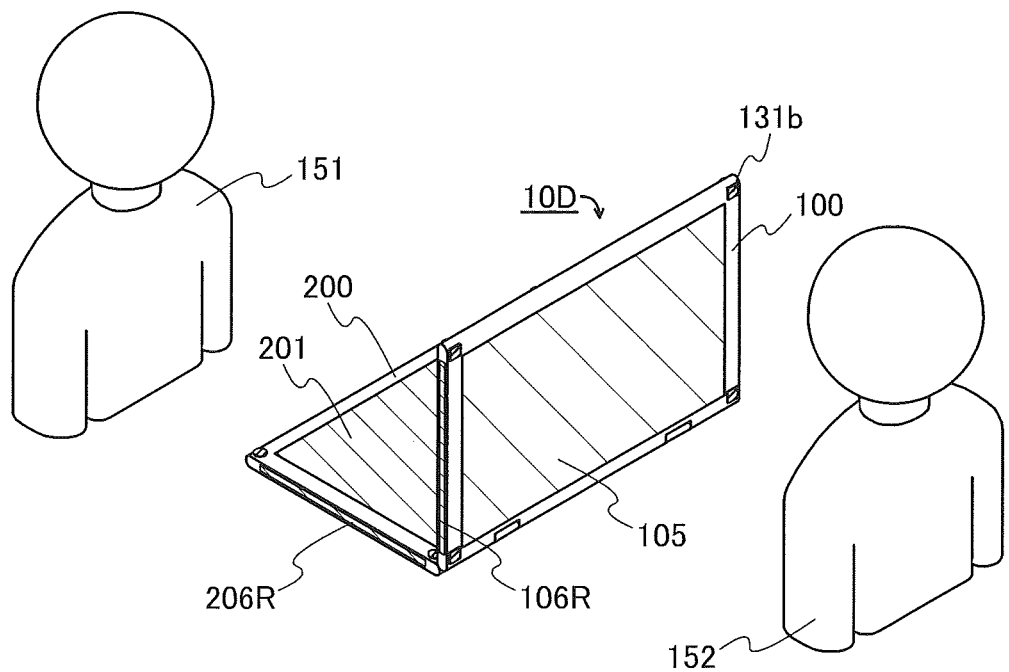

FIGS. 17A and 17B are perspective views of the electronic device 10D. FIGS. 17A and 17B show examples of the electronic device 10D which is changed in form.

The electronic device 10D includes a display device 105 on the rear surface side of the housing 100, a display device 106L on one side surface of the housing 100, and a display device 106R on the other side surface of the housing 100. In addition, the electronic device 10D includes a display device 206L on one side surface of the housing 200 and a display device 206R on the other side surface of the housing 200.

Although not illustrated, a display device may be provided on the rear surface side of the housing 200.

When the number of display devices to be used is increased, high visibility and easy operability of the electronic device can be achieved.

<Structure Example of Display Device>

The display device can employ various modes and include various display elements. The number of kinds of display elements used in one display device is not limited to one. In one display device, a plurality of kinds of display elements may be combined. Examples of the display elements include an electroluminescent (EL) element (e.g., an EL element including organic and inorganic materials, an organic EL element, or an inorganic EL element), an LED (e.g., a white LED, a red LED, a green LED, or a blue LED), a transistor that emits light depending on current, an electron emitter, a liquid crystal element, electronic ink, an electrophoretic element, a grating light valve (GLV), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, and a display element including a carbon nanotube, which are display media whose contrast, luminance, reflectance, transmittance, or the like is changed by electrical or magnetic action. Alternatively, quantum dots may be used as the display element. As the display element, a micro LED (mLED) may be used.

Examples of display devices including EL elements include an EL display. Examples of display devices including an electron emitter include a field emission display (FED), an SED-type flat panel display (SED: surface-conduction electron-emitter display), and the like. Examples of display devices containing quantum dots include a quantum dot display. Examples of display devices including a liquid crystal element include a liquid crystal display (e.g., a transmissive liquid crystal display, a transflective liquid crystal display, a reflective liquid crystal display, a direct-view liquid crystal display, or a projection liquid crystal display). Examples of display devices including electronic ink, Electronic Liquid Powder (registered trademark), or an electrophoretic element include electronic paper. The display device may be a plasma display panel (PDP).

In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes. Thus, the power consumption can be further reduced.

Note that in the case of using an LED, graphene or graphite may be provided under an electrode or a nitride semiconductor of the LED. Graphene or graphite may be a multilayer film in which a plurality of layers are stacked. When graphene or graphite is provided in this manner, a nitride semiconductor, for example, an n-type GaN semiconductor layer including crystals or the like can be easily formed thereover. Furthermore, a p-type GaN semiconductor layer including crystals or the like can be provided thereover, and thus the LED can be formed. Note that an MN layer may be provided between the n-type GaN semiconductor layer including crystals and graphene or graphite. The GaN semiconductor layers included in the LED may be formed by metal organic chemical vapor deposition (MOCVD). Note that when the graphene is provided, the GaN semiconductor layers included in the LED can also be formed by a sputtering method.

A structure example of the display device will be described with reference to FIGS. 18A and 18B, FIGS. 19A to 19C, FIGS. 20A and 20B, FIG. 21, and FIGS. 22A to 22C.

Figure 18A:
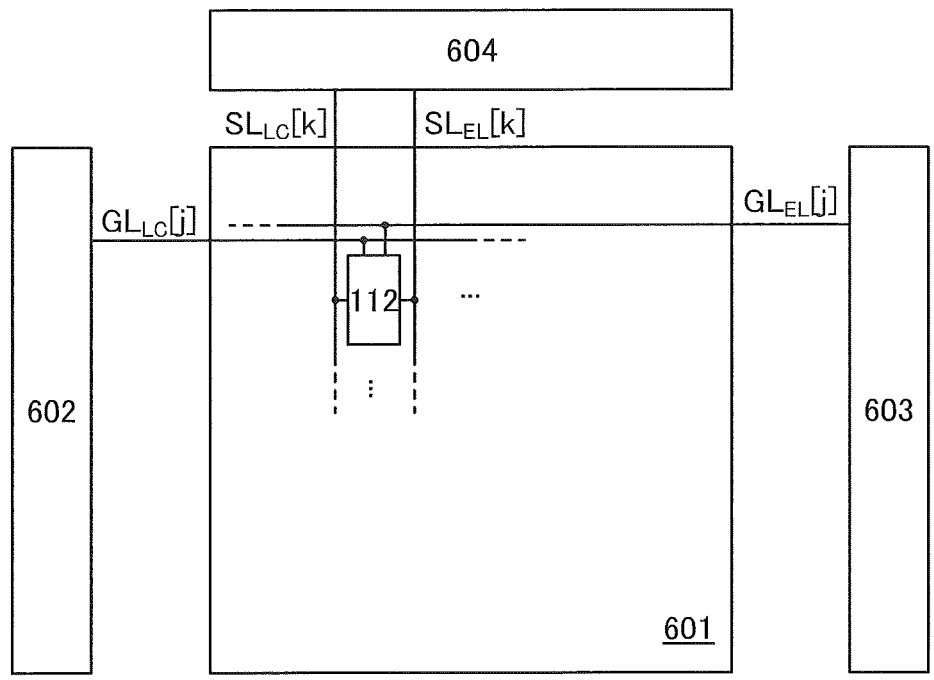
FIGS. 18A and 18B are a block diagram and a circuit diagram illustrating a structure example of an electronic device.

FIG. 18A is an example of a block diagram of a pixel portion and peripheral circuits in the display device. FIG. 18A illustrates a pixel portion 601, a gate line driver circuit 602, a gate line driver circuit 603, and a signal line driver circuit 604.

The pixel portion 601 includes a plurality of pixels arranged in m rows and n columns (each of n and m is a natural number). In FIG. 18A, the pixel provided in a j-th row and a k-th column (j is a natural number less than or equal to m, and k is a natural number less than or equal to n) is denoted by a pixel 112 as a pixel in an arbitrary row and an arbitrary column.

The pixel 112 can be used not only as a pixel that drives a display device for monochrome display but also as a pixel that drives a display device for color display. When color display is performed, the pixel 112 corresponds to subpixels where color elements have three colors of RGB (R, G, and B correspond to red, green, and blue, respectively). The number of subpixels in one pixel is not limited to three. For example, one pixel may include four subpixels: an R subpixel, a G subpixel, a B subpixel, and a W (white) subpixel. Alternatively, a color element may be composed of two colors among R, G, and B as in PenTile layout. The two colors may differ among color elements.

The gate line driver circuit 602 has a function of transmitting a scanning signal to a gate line $GL_{LC}[j]$. The gate line $GL_{LC}[j]$ transmits the scanning signal output from the gate line driver circuit 602 to the pixel 112. The scanning signal supplied to the gate line $GL_{LC}[j]$ is a signal for writing gradation voltage supplied to the signal line $SL_{LC}[k]$ into the pixel.

The gate line driver circuit 603 has a function of transmitting a scanning signal to a gate line $GL_{EL}[j]$. The gate line $GL_{EL}[j]$ transmits the scanning signal output from the gate line driver circuit 603 to the pixel 112. The scanning signal supplied to the gate line $GL_{EL}[j]$ is a signal for writing gradation voltage supplied to the signal line $SL_{EL}[k]$ into the pixel 112.

The signal line driver circuit 604 has a function of transmitting a gradation voltage for driving a liquid crystal element included in the pixel 112 to the signal line $SL_{LC}[k]$. Furthermore, the signal line driver circuit 604 has a function of transmitting a gradation voltage for driving a light-emitting element included in the pixel 112 to the signal line $SL_{EL}[k]$. The signal line $SL_{LC}[k]$ transmits the scanning signal output from the gate line driver circuit 603 to the pixel 112. The scanning signal to be applied to the gate line $GL_{EL}[j]$ is a signal for writing the gradation voltage supplied to the signal line $SL_{EL}[k]$ to the pixel 112.

Various signals (a clock signal, a start pulse, and a gradation voltage) that are necessary for driving are input to the gate line driver circuit 602, the gate line driver circuit 603, and the signal line driver circuit 604.

Figure 18B:
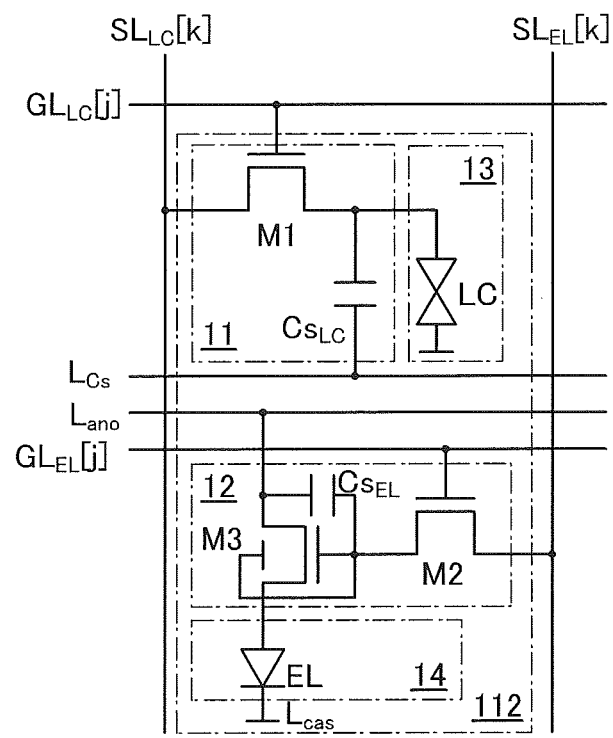

The pixel 112 will be described. FIG. 18B illustrates an example of a circuit diagram of the pixel 112. The pixel 112 includes, as illustrated in FIGS. 2A and 2B, the pixel circuit 11, the pixel circuit 12, the liquid crystal element 13, and the light-emitting element 14.

In FIG. 18B, the pixel circuit 11 includes the transistor M1 and the capacitor $Cs_{LC}$. The liquid crystal element 13 includes the liquid crystal element LC. The pixel circuit 12 includes transistors M2 and M3 and a capacitor $Cs_{EL}$. The light-emitting element 14 includes the light-emitting element EL. The components in the pixel 112 are connected to a gate line $GL_{LC}[j]$, a gate line $GL_{EL}[j]$, a signal line $SL_{LC}[k]$, a signal line $SL_{EL}[k]$, a capacitor line $L_{CS}$, a current supply line $L_{ano}$, and a common potential line $L_{cas}$ as illustrated in FIG. 18B.

Note that the capacitor $Cs_{EL}$ is provided in order to retain a grayscale voltage for driving the light-emitting element EL in a gate of the transistor M3. This structure enables more accurate retention of the grayscale voltage for driving the light-emitting element EL.

Note that the transistor M3 includes a back gate, which increases the amount of current flowing through the transistor. A voltage applied to the back gate may be supplied from another wiring, in which case the threshold voltage of the transistor can be controlled.

By controlling the electrical continuity of the transistor M1, a grayscale voltage for driving the liquid crystal element LC is applied to the capacitor $Cs_{LC}$. By controlling the electrical continuity of the transistor M2, a grayscale voltage for driving the light-emitting element EL is applied to the gate of the transistor M3. The light-emitting element EL is driven when current flows between the current supply line $L_{ano}$ and the common potential line $L_{cas}$ in accordance with the voltage of the gate of the transistor M3.

N-channel transistors can be used as the transistors M1 to M3. The n-channel transistors can be replaced with p-channel transistors by changing the magnitude relationship among voltages of the wirings. Silicon can be used as semiconductor materials of the transistors M1 to M3. As silicon, single crystal silicon, polysilicon, microcrystalline silicon, amorphous silicon, or the like can be used as appropriate.

Alternatively, an oxide semiconductor can be used as the semiconductor materials of the transistors M1 to M3. Specifically, an oxide semiconductor containing indium or an oxide semiconductor containing indium, gallium, and zinc can be used for the oxide semiconductor.

For the transistors M1 to M3 included in the pixel 112, various types of transistors, for example, a bottom gate transistor, a top gate transistor, and the like can be used.

The transistors M1 to M3 included in the pixel 112 may include back gates. Voltages applied to the back gates may be supplied from a wiring different from the gate line $GL_{LC}[j]$ and the gate line $GL_{EL}[j]$. Only one transistor, for example, the transistor M3 may have a back gate. With such a structure, the threshold voltage of the transistor can be controlled or the amount of current flowing through the transistor can be increased.

The liquid crystal element LC can be driven by any of the following driving methods: an in-plane-switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like. In addition, the liquid crystal element can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode.

For the liquid crystal element LC, a liquid crystal material such as thermotropic liquid crystal, low-molecular liquid crystal, high-molecular liquid crystal, polymer dispersed liquid crystal, ferroelectric liquid crystal, or anti-ferroelectric liquid crystal can be used. Alternatively, a liquid crystal material that exhibits a cholesteric phase, a smectic phase, a cubic phase, a chiral nematic phase, an isotropic phase, or the like can be used. Alternatively, a liquid crystal material that exhibits a blue phase can be used.

Note that the light-emitting element EL can be an EL element such as an organic electroluminescence element or an inorganic electroluminescence element, a light-emitting diode, or the like.

A stack formed to emit white light can be used as the EL element. Specifically, it is possible to use a stack of a layer containing a light-emitting organic compound containing a fluorescent material that emits blue light, and a layer containing materials that are other than a fluorescent material and that emit green light and red light or a layer containing a material that is other than a fluorescent material and that emits yellow light.

Next, a layout diagram of a pixel which can be used as the pixel 112 is described. A circuit diagram of FIG. 19A is equivalent to the circuit diagram of FIG. 18B.

The layout diagram in FIG. 19B corresponds to the arrangement of the components in the circuit diagram in FIG. 19A. FIG. 19B illustrates an electrode $PE_{EL}$ of the light-emitting element EL, the light-emitting element EL, arrangement of the transistors M1 to M3, the gate line $GL_{LC}[j]$, the gate line $GL_{EL}[j]$, the signal line $SL_{LC}[k]$, the signal line $SL_{EL}[k]$, the capacitor line $L_{CS}$, the current supply line $L_{ano}$, and the common potential line $L_{cs}$.

The layout diagram in FIG. 19C corresponds to the arrangement of the components in the circuit diagram in FIG. 19A. FIG. 19C illustrates a reflective electrode $PE_{LC}$ of the liquid crystal element LC, the opening 15 arranged so as to overlap with the light-emitting element EL, arrangement of the transistors M1 to M3, the gate line $GL_{LC}[j]$, the gate line $GL_{EL}[j]$, the signal line $SL_{LC}[k]$, the signal line $SL_{EL}[k]$, the capacitor line $L_{CS}$, the current supply line $L_{ano}$, and the common potential line $L_{cs}$.

Although the liquid crystal element LC and the light-emitting element EL are provided separately in the layout diagrams in FIGS. 19B and 19C, they are provided to overlap with each other.

Figure 20A:
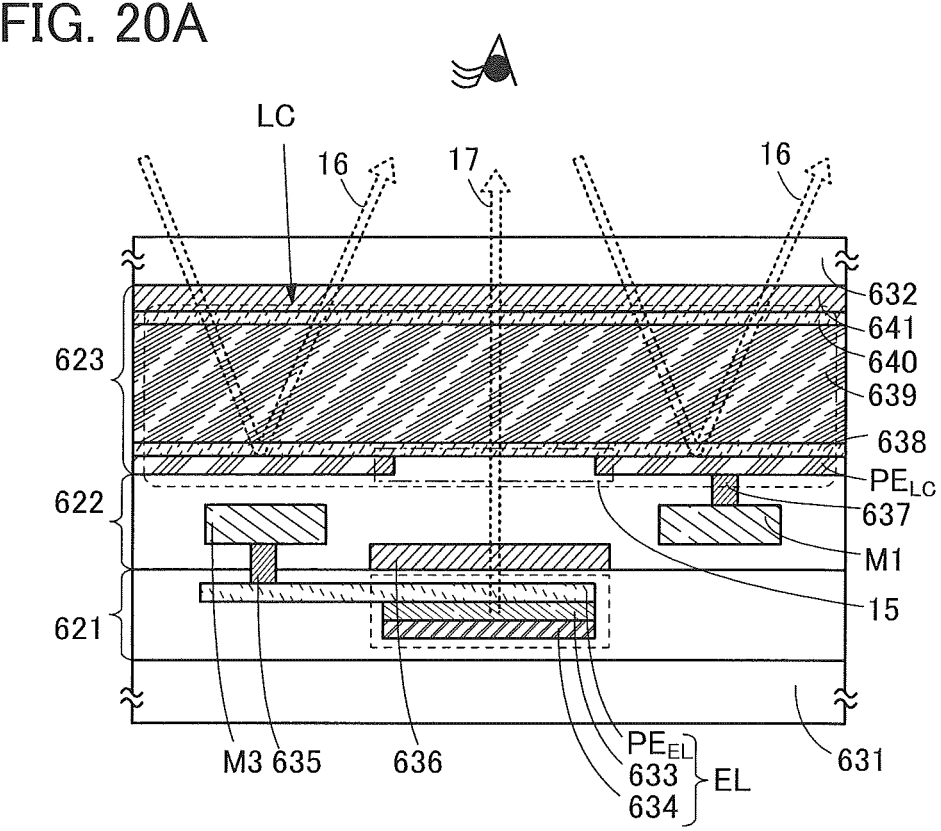
FIGS. 20A and 20B are a cross-sectional schematic view and a perspective view illustrating a structure example of an electronic device.

FIG. 20A is a schematic cross-sectional view illustrating a stacked structure of the liquid crystal element LC and the light-emitting element EL. In FIG. 20A, a layer 621 including the light-emitting element EL, a layer 622 including the transistor, and a layer 623 including the liquid crystal element LC are illustrated. The layers 621 to 623 are provided between substrates 631 and 632. Although not illustrated, an optical member such as a polarizing plate may be included.

The layer 621 includes the light-emitting element EL. The light-emitting element EL includes the electrode $PE_{EL}$ illustrated in FIG. 19B, a light-emitting layer 633, and an electrode 634. When current flows to the light-emitting layer 633 between the electrode $PE_{EL}$ and the electrode 634, the light 17 (denoted by a dotted arrow) is emitted. The intensity of the light 17 is controlled by the transistor M3 in the layer 622.

The layer 622 includes the transistors M1 and M3, and a color filter 636. The layer 622 further includes a conductive layer 637 functioning as an electrode for connecting the transistor M1 and the reflective electrode $PE_{LC}$, and a conductive layer 635 functioning as an electrode for connecting the transistor M3 and the electrode $PE_{EL}$. The color filter 636 is provided when the light 17 is white light, and the light with a specific wavelength can be emitted to the viewer side. The color filter 636 is provided so as to overlap with the opening 15. The transistors M1 to M3 (the transistor M2 is not illustrated) are provided so as to overlap with the reflective electrode $PE_{LC}$.

The layer 623 includes the opening 15, the reflective electrode $PE_{LC}$, a conductive layer 638, a liquid crystal 639, a conductive layer 640, and a color filter 641. Orientation of the liquid crystal 639 between a pair of the conductive layer 638 and the conductive layer 640 is controlled by the conductive layer 638. The reflective electrode $PE_{LC}$ reflects the external light and emits the reflected light 16 (denoted by a dotted arrow). The intensity of the reflected light 16 is controlled by adjustment of orientation of the liquid crystal 639 by the transistor M1. The opening 15 is provided in a position that transmits the light 17 emitted from the light-emitting element EL in the layer 621.

The light-emitting element EL included in the layer 621 corresponds to the light-emitting element 14 illustrated in FIGS. 2A and 2B and the like. The transistor M3 included in the layer 622 corresponds to the transistor included in the pixel circuit 12 illustrated in FIGS. 2A and 2B and the like. The transistor M1 included in the layer 622 corresponds to the transistor included in the pixel circuit 11 illustrated in FIGS. 2A and 2B and the like. The liquid crystal element LC included in the layer 623 corresponds to the liquid crystal element 13 illustrated in FIGS. 2A and 2B and the like.

A material that reflects visible light can be used for the reflective electrode $PE_{LC}$, for example. Specifically, a material containing silver can be used for the reflective film. For example, a material containing silver, palladium, and the like or a material containing silver, copper, and the like can be used for the reflective film. Alternatively, for example, a material with unevenness on its surface can be used for the reflective film. In that case, incident light can be reflected in various directions so that a white image can be displayed.

A material that transmits visible light can be used for the conductive layers 638 and 640. Specifically, a conductive oxide such as indium oxide, indium tin oxide, indium zinc oxide, zinc oxide, or zinc oxide to which gallium is added, or graphene can be used.

For example, an inorganic material such as glass, ceramics, or metal can be used for the substrates 631 and 632. Alternatively, a flexible material, for example, an organic material such as a resin film or plastics can be used for the substrates 631 and 632. Note that members such as a polarizing plate, a retardation plate, and a prism sheet can be stacked on the substrates 631 and 632 as appropriate.

For example, an insulating inorganic material, an insulating organic material, or an insulating composite material containing an inorganic material and an organic material can be used for the insulating layer included in the display device. For the insulating layer, a silicon oxide film, a silicon nitride film, a silicon oxynitride film, an aluminum oxide film, or the like, or a stacked material of any of these films can be used. Alternatively, polyester, polyolefin, polyamide, polyimide, polycarbonate, polysiloxane, an acrylic resin, or the like, or a stacked material or a composite material of a plurality of resins selected from these materials can be used.

The conductive layers such as the conductive layers 635 and 637 included in the display device can be formed using a conductive material and can be used for wirings or the like. For example, a metal element selected from aluminum, gold, platinum, silver, copper, chromium, tantalum, titanium, molybdenum, tungsten, nickel, iron, cobalt, palladium, and manganese can be used. Alternatively, an alloy containing any of the above-described metal elements, or the like can be used for the wiring or the like.

The light-emitting layer 633 included in the display device is formed by combining any of an EL layer, a charge-transport layer, and a charge-injection layer freely. For example, a low molecular organic EL material or a high molecular organic EL material is used. As the EL layer, a thin film made of a light-emitting material that emits light (fluorescence) by singlet excitation (a singlet compound) or a thin film made of a light-emitting material that emits light (phosphorescence) by triplet excitation (a triplet compound) can be used. In addition, an inorganic material such as silicon carbide can also be used as the charge-transport layer and the charge-injection layer. The organic EL material and inorganic material may be formed using known materials.

The electrode $PE_{EL}$ included in the display device functions as an anode of the light-emitting element EL. A material for forming the anode has a work function higher than that of a material for forming a cathode. For example, indium oxide tin oxide (ITO), indium oxide zinc oxide ($In_2O_3$—ZnO), or zinc oxide (ZnO), or a material having lower sheet resistance than ITO, such as platinum (Pt), chromium (Cr), tungsten (W), or nickel (Ni) can be used.

The electrode 634 included in the display device can be formed using a metal having a low work function (typically, a metal element which belongs to Group 1 or Group 2 of the periodic table), or an alloy thereof. As the work function is lower, the luminous efficiency is improved; thus, in particular, an alloy material containing lithium (Li), which is an alkali metal, is preferably used as a material used for the cathode.

Figure 20B:
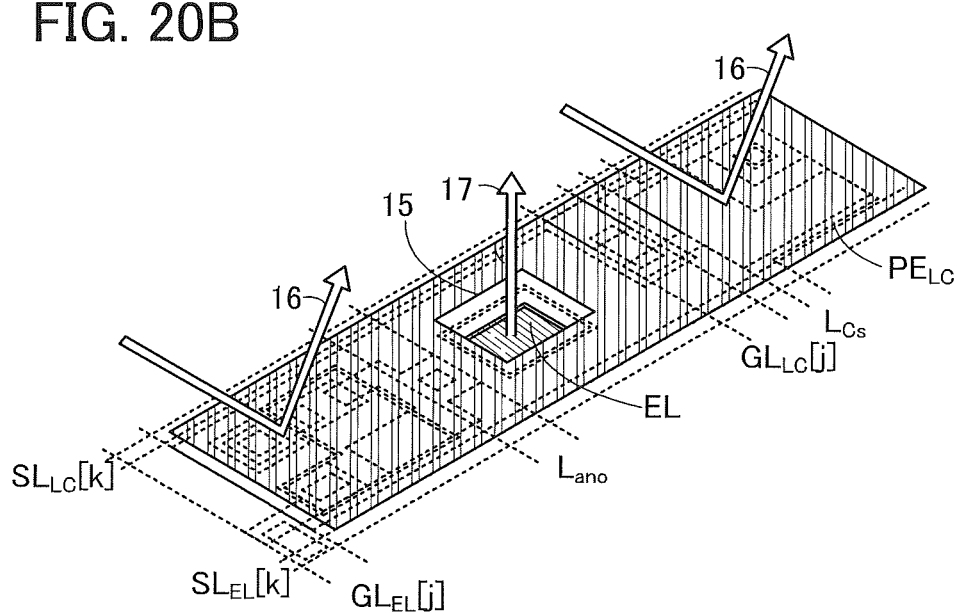

FIG. 20B is a perspective view in which the layout diagrams in FIGS. 19B and 19C overlap with each other for illustrating the stacked structure of the liquid crystal element LC and the light-emitting element EL. As illustrated in FIG. 20B, the liquid crystal element LC and the light-emitting element EL are provided to overlap with each other. Then, the opening 15 is provided in a position that transmits the light 17 emitted from the light-emitting element EL. With such a structure, switching of display elements in accordance with the surrounding environment can be achieved without increasing the area occupied by the pixel. Consequently, a display device with improved visibility can be obtained.

Figure 21:
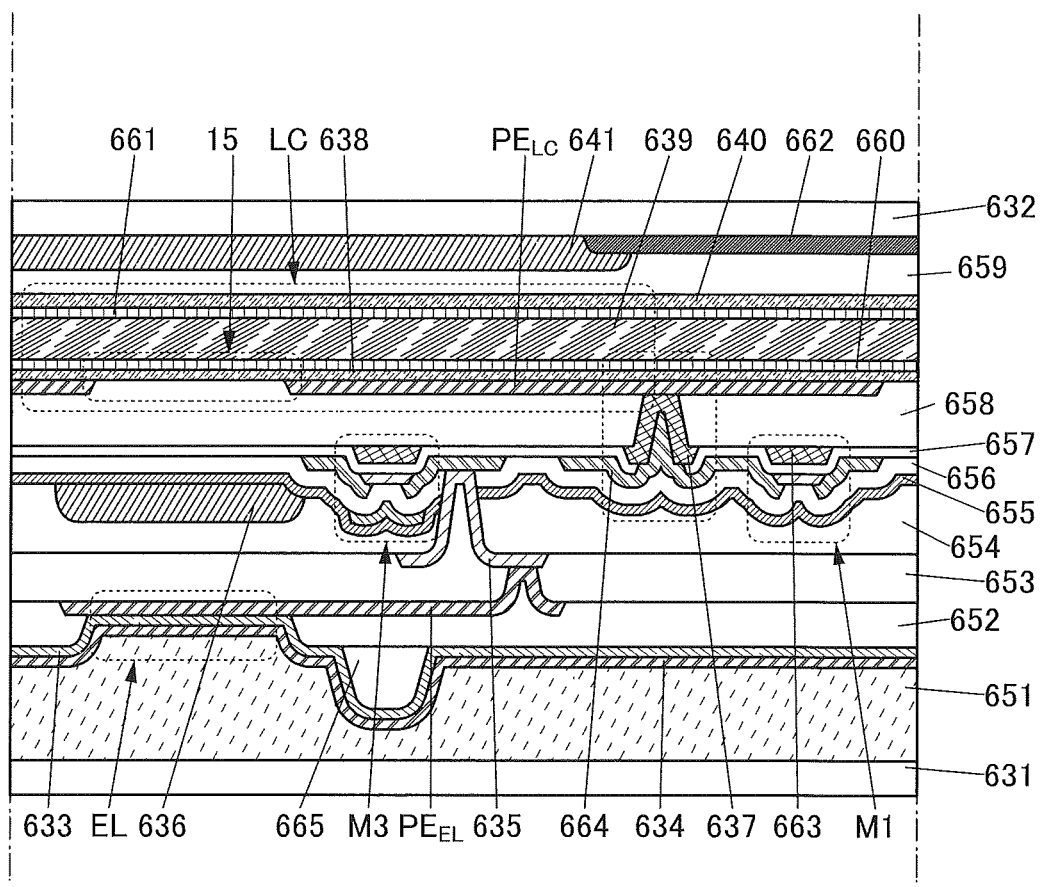
FIG. 21 is a cross-sectional schematic view illustrating a structure example of an electronic device.

FIG. 21 shows a detailed schematic cross-sectional view of the pixel in FIG. 20A. In FIG. 21, the same components as in FIG. 20A are denoted by the same reference numerals and the description thereof is not repeated.

In the schematic cross-sectional view of the pixel of the display device in FIG. 21, in addition to the components in FIG. 20A, an adhesive layer 651, an insulating layer 652, an insulating layer 653, an insulating layer 654, an insulating layer 655, an insulating layer 656, an insulating layer 657, an insulating layer 658, an insulating layer 659, an alignment film 660, an alignment film 661, a light-blocking film 662, a conductive layer 663, a conductive layer 664, and an insulating layer 665 are provided between the substrates 631 and 632.

The insulating layer 652, the insulating layer 653, the insulating layer 654, the insulating layer 655, the insulating layer 656, the insulating layer 657, the insulating layer 658, the insulating layer 659, and the insulating layer 665 can be formed using an insulating inorganic material, an insulating organic material, or an insulating composite material containing an inorganic material and an organic material. For the insulating layer, a silicon oxide film, a silicon nitride film, a silicon oxynitride film, an aluminum oxide film, or the like, or a stacked material of any of these films can be used. Alternatively, polyester, polyolefin, polyamide, polyimide, polycarbonate, polysiloxane, an acrylic resin, or the like, or a stacked material or a composite material of a plurality of resins selected from these materials can be used.

The conductive layers 663 and 664 can be formed using a conductive material and can be used for wirings or the like. For example, a metal element selected from aluminum, gold, platinum, silver, copper, chromium, tantalum, titanium, molybdenum, tungsten, nickel, iron, cobalt, palladium, and manganese can be used for the conductive layer. Alternatively, an alloy containing any of the above-described metal elements, or the like can be used for the wiring or the like.

As the adhesive layer 651, a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, and the like. In particular, a material with low moisture permeability, such as an epoxy resin, is preferred. Alternatively, a two-component type resin may be used. Still alternatively, an adhesive sheet or the like may be used.

For the alignment film 660 and the alignment film 661, an organic resin such as polyimide can be used. In the case where optical alignment treatment for aligning the liquid crystal 639 in a predetermined direction is performed, the alignment film 660 and the alignment film 661 may be omitted. Also in the case of using a liquid crystal which does not need alignment treatment, the alignment film 660 and the alignment film 661 may be omitted.

The light-blocking film 662 can be formed using a light-blocking material which absorbs light, such as chromium, chromium oxide, or a black resin.

FIGS. 22A to 22C show schematic cross-sectional views of a terminal portion, a driver circuit portion, and a common contact portion which correspond to the schematic cross-sectional view of the pixel of the display device in FIG. 21. In FIGS. 22A to 22C, the same components as in FIG. 20A and FIG. 21 are denoted by the same reference numerals and the description thereof is not repeated.

FIG. 22A is the schematic cross-sectional view of the terminal portion of the display device. In a connection portion 670 for connection to an external circuit in the terminal portion, the conductive layer 637, the conductive layer 664, the reflective electrode $PE_{LC}$, and the conductive layer 638 are stacked. A flexible printed circuit (FPC) 672 is connected to the connection portion 670 through a connection layer 671. An adhesive layer 673 is provided at an end portion of the substrate 632, thereby attaching the substrate 632 to the substrate 631.

FIG. 22B is the schematic cross-sectional view of the driver circuit portion of the display device. A transistor 680 in the driver circuit portion can have the same structure as the transistor M3.

FIG. 22C is the schematic cross-sectional view of the common contact portion of the display device. At a connection portion 690 in the common contact portion, the conductive layer 640 on the substrate 632 side is connected to the conductive layer 638 and the reflective electrode $PE_{LC}$ on the substrate 631 side through a connector 691 in the adhesive layer 673.

The above is the description of the components of the display device.

<Notes on Description of this Specification and the Like>

In this specification and the like, ordinal numbers such as first, second, and third are used in order to avoid confusion among components. Thus, the terms do not limit the number or order of components.

In a block diagram in this specification and the like, components are functionally classified and shown by blocks that are independent of each other. However, in an actual circuit and the like, such components are sometimes hard to classify functionally, and there is a case where one circuit is associated with a plurality of functions or a case where a plurality of circuits are associated with one function. Therefore, the segmentation of blocks in a block diagram is not limited by any of the components described in the specification and can be differently determined as appropriate depending on the situation.

The same elements or elements having similar functions, elements formed using the same material, elements formed at the same time, or the like in the drawings are denoted by the same reference numerals, and the description thereof is not repeated in some cases.

In this specification and the like, the terms "one of a source and a drain" (or first electrode or first terminal) and "the other of the source and the drain" (or second electrode or second terminal) are used to describe the connection relationship of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, "voltage" and "potential" can be replaced with each other. The term "voltage" refers to a potential difference from a reference potential. When the reference potential is a ground potential, for example, "voltage" can be replaced with "potential". The ground potential does not necessarily mean 0 V. Potentials are relative values, and a potential supplied to a wiring or the like is sometimes changed depending on the reference potential.

In this specification and the like, a switch is in a conductive state (on state) or in a non-conductive state (off state) to determine whether current flows therethrough or not. Alternatively, a switch has a function of selecting and changing a current path.

Examples of a switch are an electrical switch, a mechanical switch, and the like. That is, any element can be used as a switch as long as it can control current, without limitation to a certain element.

In the case of using a transistor as a switch, an "on state" of the transistor refers to a state in which a source and a drain of the transistor are electrically short-circuited. Furthermore, an "off state" of the transistor refers to a state in which the source and the drain of the transistor are electrically disconnected. In the case where a transistor operates just as a switch, the polarity (conductivity type) of the transistor is not particularly limited to a certain type.

In this specification and the like, the expression "A and B are connected" or "A is connected to B" means the case where A and B are electrically connected to each other as well as the case where A and B are directly connected to each other. Here, the expression "A and B are electrically connected" means the case where electric signals can be transmitted and received between A and B when an object having any electric action exists between A and B.

This application is based on Japanese Patent Application serial no. 2016-089999 filed with Japan Patent Office on Apr.

28, 2016, and Japanese Patent Application serial no. 2016-135721 filed with Japan Patent Office on Jul. 8, 2016, the entire contents of which are hereby incorporated by reference.

What is claimed is:

1. An electronic device comprising:
a first housing, the first housing comprising a solar battery and a first display device; and
a second housing, the second housing comprising a second display device, a coil, an electric double-layer capacitor, a signal processing circuit, and a charge and discharge control circuit,
wherein the electronic device is folded so that a display surface of the first display device and a display surface of the second display device face each other,
wherein the charge and discharge control circuit comprises a reverse current prevention circuit, a rectifying and smoothing circuit, and a monitor circuit,
wherein the solar battery is configured to be electrically connected to the electric double-layer capacitor through the reverse current prevention circuit,
wherein the coil is configured to be electrically connected to the electric double-layer capacitor through the rectifying and smoothing circuit,
wherein the coil is configured to obtain power from an outside by contactless power feeding,
wherein the solar battery is positioned on a surface of the first housing on a rear side of the display surface of the first display device,
wherein the monitor circuit is configured to monitor a voltage output from the electric double-layer capacitor and estimate remaining capacity of the electric double-layer capacitor,
wherein the monitor circuit is configured to output the voltage from the electric double-layer capacitor to the signal processing circuit,
wherein the signal processing circuit is configured to change a period during which data for performing display is held in accordance with the remaining capacity,
wherein the first display device and the second display device each comprise a pixel,
wherein the pixel comprises a liquid crystal element, a first pixel circuit for driving the liquid crystal element, a light-emitting element, and a second pixel circuit for driving the light-emitting element,
wherein the liquid crystal element comprises a reflective electrode comprising an opening and is configured to perform display by reflecting external light,
wherein the light-emitting element of the first display device is configured to perform display by emitting light toward the display surface of the first display device through the opening, and
wherein the light-emitting element of the second display device is configured to perform display by emitting light toward the display surface of the second display device through the opening.

2. The electronic device according to claim 1,
wherein the first pixel circuit and the second pixel circuit each comprise a transistor, and
wherein the transistor comprises a metal oxide in a semiconductor layer in which a channel formation region is formed.

3. The electronic device according to claim 1, wherein the coil, the electric double-layer capacitor, the signal processing circuit, and the charge and discharge control circuit are positioned in the second housing.

4. The electronic device according to claim 1, further comprising:
a sensor,
wherein the sensor is configured to measure illuminance, and
wherein the signal processing circuit is configured to switch between, in accordance with the illuminance, a first mode for performing display with the liquid crystal element, a second mode for performing display with the liquid crystal element and the light-emitting element, and a third mode for performing display with the light-emitting element.

5. The electronic device according to claim 1, wherein the first display device and the second display device each comprise a touch sensor.

6. An electronic device comprising:
a first housing, the first housing comprising a solar battery, a first display device, and a first structure body; and
a second housing, the second housing comprising a second display device, a coil, an electric double-layer capacitor, a signal processing circuit, a charge and discharge control circuit, and a second structure body,
wherein the electronic device is folded so that a display surface of the first display device and a display surface of the second display device face each other,
wherein the electronic device is folded so that the first structure body and the second structure body face each other,
wherein the charge and discharge control circuit comprises a reverse current prevention circuit, a rectifying and smoothing circuit, and a monitor circuit,
wherein the solar battery is configured to be electrically connected to the electric double-layer capacitor through the reverse current prevention circuit,
wherein the coil is configured to be electrically connected to the electric double-layer capacitor through the rectifying and smoothing circuit,
wherein the coil is configured to obtain power from an outside by contactless power feeding,
wherein the solar battery is positioned on a surface of the first housing on a rear side of the display surface of the first display device,
wherein the monitor circuit is configured to monitor a voltage output from the electric double-layer capacitor and estimate remaining capacity of the electric double-layer capacitor,
wherein the monitor circuit is configured to output the voltage from the electric double-layer capacitor to the signal processing circuit,
wherein the signal processing circuit is configured to change a period during which data for performing display is held in accordance with the remaining capacity,
wherein the first display device and the second display device each comprise a pixel,
wherein the pixel comprises a liquid crystal element, a first pixel circuit for driving the liquid crystal element, a light-emitting element, and a second pixel circuit for driving the light-emitting element,
wherein the liquid crystal element comprises a reflective electrode comprising an opening and is configured to perform display by reflecting external light,
wherein the light-emitting element of the first display device is configured to perform display by emitting light toward the display surface of the first display device through the opening, and wherein the light-emitting element of the second display device is configured to perform display by emitting light toward the display surface of the second display device through the opening.

7. The electronic device according to claim 6, wherein the first structure body and the second structure body each comprise natural rubber or synthetic rubber.

8. The electronic device according to claim 6, wherein the first structure body and the second structure body each have Young's modulus greater than or equal to 1 MPa and less than or equal to 1 GPa.

9. The electronic device according to claim 6, wherein the first structure body and the second structure body each comprise a magnetic material.

10. The electronic device according to claim 6,
wherein the first pixel circuit and the second pixel circuit each comprise a transistor, and
wherein the transistor comprises a metal oxide in a semiconductor layer in which a channel formation region is formed.

11. The electronic device according to claim 6, wherein the coil, the electric double-layer capacitor, the signal processing circuit, and the charge and discharge control circuit are positioned in the second housing.

12. The electronic device according to claim 6, further comprising:
a sensor,
wherein the sensor is configured to measure illuminance, and
wherein the signal processing circuit is configured to switch between, in accordance with the illuminance, a first mode for performing display with the liquid crystal element, a second mode for performing display with the liquid crystal element and the light-emitting element, and a third mode for performing display with the light-emitting element.

13. The electronic device according to claim 6, wherein the first display device and the second display device each comprise a touch sensor.

14. An electronic device comprising:
a first housing, the first housing comprising a solar battery and a first display device; and
a second housing, the second housing comprising a second display device, a coil, an electric double-layer capacitor, a signal processing circuit, and a charge and discharge control circuit,
wherein the electronic device is folded so that a display surface of the first display device and a display surface of the second display device face each other,
wherein the solar battery is positioned on a surface of the first housing on a rear side of the display surface of the first display device,
wherein the charge and discharge control circuit comprises a reverse current prevention circuit, a rectifying and smoothing circuit and a monitor circuit,
wherein the solar battery is configured to be electrically connected to the electric double-layer capacitor through the reverse current prevention circuit,
wherein the coil is configured to be electrically connected to the electric double-layer capacitor through the rectifying and smoothing circuit,
wherein the coil is configured to obtain power from an outside by contactless power feeding,
wherein the monitor circuit is configured to monitor a voltage output from the electric double-layer capacitor and estimate remaining capacity of the electric double-layer capacitor,
wherein the monitor circuit is configured to output the voltage from the electric double-layer capacitor to the signal processing circuit, and
wherein the signal processing circuit is configured to change a period during which data for performing display is held in accordance with the remaining capacity.

15. The electronic device according to claim 14,
wherein the first display device and the second display device each comprise a pixel,
wherein the pixel comprises a first display element and a second display element,
wherein the first display element overlaps with the second display element,
wherein the first display element has an opening,
wherein the second display element of the first display device is configured to perform display by emitting light toward the display surface of the first display device through the opening, and
wherein the second display element of the second display device is configured to perform display by emitting light toward the display surface of the second display device through the opening.

16. The electronic device according to claim 15,
wherein the pixel further comprises a first pixel circuit for driving the first display element and a second pixel circuit for driving the second display element,
wherein the first pixel circuit and the second pixel circuit each comprise a transistor, and
wherein the transistor comprises a metal oxide in a semiconductor layer in which a channel formation region is formed.

17. The electronic device according to claim 14, wherein the coil, the electric double-layer capacitor, the signal processing circuit, and the charge and discharge control circuit are positioned in the second housing.

18. The electronic device according to claim 15, further comprising:
a sensor,
wherein the sensor is configured to measure illuminance, and
wherein the signal processing circuit is configured to switch between, in accordance with the illuminance, a first mode for performing display with the first display element, a second mode for performing display with the first display element and the second display element, and a third mode for performing display with the second display element.

19. The electronic device according to claim 14, wherein the first display device and the second display device each comprise a touch sensor.

* * * * *